US009767732B2

(12) United States Patent
Park et al.

(10) Patent No.: US 9,767,732 B2
(45) Date of Patent: Sep. 19, 2017

(54) DISPLAY DEVICE

(71) Applicant: SAMSUNG DISPLAY CO., LTD., Yongin, Gyeonggi-Do (KR)

(72) Inventors: Kyong Tae Park, Suwon-si (KR); Mi Jin Yoon, Daegu (KR); Yu Hyun Cho, Seoul (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 209 days.

(21) Appl. No.: 14/571,339

(22) Filed: Dec. 16, 2014

(65) Prior Publication Data

US 2016/0035283 A1 Feb. 4, 2016

(30) Foreign Application Priority Data

Jul. 29, 2014 (KR) ........................ 10-2014-0096557

(51) Int. Cl.
*G06F 3/038* (2013.01)
*G09G 3/3258* (2016.01)

(52) U.S. Cl.
CPC ... *G09G 3/3258* (2013.01); *G09G 2300/0413* (2013.01); *G09G 2300/0819* (2013.01); *G09G 2320/043* (2013.01); *G09G 2330/10* (2013.01); *G09G 2330/12* (2013.01)

(58) Field of Classification Search
CPC ....... G09G 2330/08; G09G 2300/0413; G09G 2330/10; G09G 3/3233; G09G 2300/0426; G09G 3/006; G09G 2320/043; G09G 2300/043; G09G 3/3258; G09G 3/30; G09G 3/32; G09G 3/3275; G09G 2320/103
USPC ....................................................... 345/76–84
See application file for complete search history.

(56) References Cited

U.S. PATENT DOCUMENTS 8,554,279 B2 * 10/2013 Otaka .................. G09G 3/3406 257/342
9,129,923 B1 * 9/2015 Han .................... H01L 27/3248
2014/0240304 A1 * 8/2014 In ......................... G09G 3/3233 345/212
2015/0161943 A1 * 6/2015 Shim .................... G09G 3/3225 345/76

FOREIGN PATENT DOCUMENTS

KR 10-0666639 B1 1/2007
KR 10-2008-0100533 A 11/2008
KR 10-2013-0128146 A 11/2013

* cited by examiner

*Primary Examiner* — Duc Dinh
(74) *Attorney, Agent, or Firm* — Lee & Morse P.C.

(57) ABSTRACT

A display device includes dummy pixels adjacent to active pixels, and a controller to control pixel driving circuits in the active pixels and dummy driving circuits in the dummy pixels. The dummy driving circuit includes a pumping capacitor, and first and second transistors to connect an initialization voltage terminal to a dummy anode terminal. The first transistor includes a control electrode connected to a first input signal terminal, a source terminal connected to the dummy anode terminal, a drain terminal connected to a source terminal via a first node. The pumping capacitor connects the first node and a first power source voltage terminal. The second transistor includes a control electrode connected to a second input signal terminal, a source terminal connected to the drain terminal of the first transistor, and a drain terminal connected to a second power source voltage terminal.

20 Claims, 20 Drawing Sheets

DISPLAY DEVICE

CROSS-REFERENCE TO RELATED APPLICATION

Korean Patent Application No. 10-2014-0096557, filed on Jul. 29, 2014, and entitled, "Display Device," is incorporated by reference herein in its entirety.

BACKGROUND

1. Field

One or more embodiments described herein relate to a display device.

2. Description of the Related Art

Many types of displays have been developed. Examples include liquid crystal displays, electrophoretic displays, organic light-emitting displays, inorganic electroluminescent displays, field emission displays, surface-conduction electron-emitter displays, plasma displays, and cathode ray tube displays.

Display devices may be classified as passive matrix displays or active matrix displays according to a driving method of its pixels. An active matrix display consumes less power than a passive matrix display device, and therefore may be more suitable for large-size displays. Also, active matrix displays provide a higher resolution than the passive matrix displays. Active matrix displays generally include pixel driving circuits connected to liquid crystal capacitors or LEDs.

Each pixel driving circuit includes a thin-film transistor and a capacitor. In a liquid crystal display or organic light-emitting display, defects may occur in the transistors or capacitors of the pixel driving circuits. Consequently, the LED or liquid crystal capacitor connected to the defective pixel driving circuit may experience a dark- or bright-spot phenomenon.

Pixel defects caused by defective pixel driving circuits are difficult to locate with precision. Even if they are located, it is almost impossible to repair them because pixel driving circuits are generally located deep inside the display device near the substrate. Therefore, it is very difficult to repair defective pixels caused by defects in pixel driving circuits.

SUMMARY

In accordance with one embodiment, a display device includes a display panel including a plurality of dummy pixels adjacent to a plurality of active pixels; a controller to control a pixel driving circuit in each of the active pixels and a dummy driving circuit in each of the dummy pixels, wherein the dummy driving circuit includes a pumping capacitor, and a first transistor and a second transistor which connect a terminal to which an initialization voltage is to be applied and a dummy anode terminal, and wherein: the first transistor includes a control electrode connected to a first input signal terminal, a source terminal connected to the dummy anode terminal, a drain terminal connected to a source terminal via a first node, the pumping capacitor connects the first node and a first power source voltage terminal, and the second transistor includes a control electrode connected to a second input signal terminal, a source terminal connected to the drain terminal of the first transistor, and a drain terminal connected to a second power source voltage terminal.

The controller may include a comparator to determine if the pixel driving circuit is defective, and a synchronizer to synchronize an output signal of the dummy driving circuit. The device may include a plurality of repair lines extending in a first direction, wherein the repair lines may overlap the active pixels and may be electrically connected to the dummy pixels adjacent to the active pixels.

At least one of the active pixels may be electrically connected to at least one of he repair lines. The comparator may control connections between the repair lines and the pixel driving circuits of the active pixels. The pixel driving circuit may include a third transistor and a fourth transistor, and a control terminal of the third transistor may be electrically connected to a control terminal of the fourth transistor.

The pixel driving circuit may include a third transistor and a fourth transistor, a control terminal of the third transistor may be connected to the second input signal terminal, and a control terminal of the fourth transistor may be connected to a third input signal terminal.

In accordance with another embodiment, a display device includes a display panel including a plurality of dummy pixels adjacent to a plurality of active pixels; a controller to control a pixel driving circuit in each of the active pixels and a dummy driving circuit in each of the dummy pixels, wherein the dummy driving circuit includes a boost diode and a first transistor, and wherein the first transistor is to apply a voltage at an anode terminal of the boost diode to a first node.

The controller may include a comparator to determine if the pixel driving circuit is defective, and a synchronizer to synchronize an output signal of the dummy driving circuit. The device may include a plurality of repair lines extending in a first direction, wherein the repair lines overlap the active pixels and may be electrically connected to dummy pixels adjacent to the active pixels.

At least one of the active pixels may be electrically connected to at least one of the repair lines. The comparator may control connections between the repair lines and the pixel driving circuits of the active pixels. The pixel driving circuit may include a second transistor and a third transistor, and a control terminal of the second transistor may be electrically connected to a control terminal of the third transistor.

The pixel driving circuit may include a second transistor and a third transistor, a control terminal of the second transistor may be connected to a first input signal terminal, and a control terminal of the third transistor may be connected to a second input signal terminal. The dummy driving circuit may include a first boost capacitor to connect the first node and the control terminal of the first transistor.

The dummy driving circuit may include a fourth transistor to connect the first node and a first power source voltage terminal, and a control terminal of the fourth transistor may be electrically connected to a source terminal of the fourth transistor. The dummy driving circuit may include a second boost capacitor to connect the first node and a third input signal terminal.

In accordance with another embodiment, a display device includes a display panel includes a plurality of dummy pixels adjacent to a plurality of active pixels; a controller to control a pixel driving circuit in each of the active pixels and a dummy driving circuit in each of the dummy pixels, wherein the dummy driving circuit and the pixel driving circuit are connected by one of a plurality of repair lines, and wherein the dummy driving circuit includes a discharge diode connected to a node to which the dummy driving circuit and the repair line are electrically connected.

The controller may include a comparator to determine if the pixel driving circuit is defective and a synchronizer to synchronize an output signal of the dummy driving circuit. The repair lines may overlap the active pixels and may be electrically connected to the dummy pixels adjacent to the active pixels.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
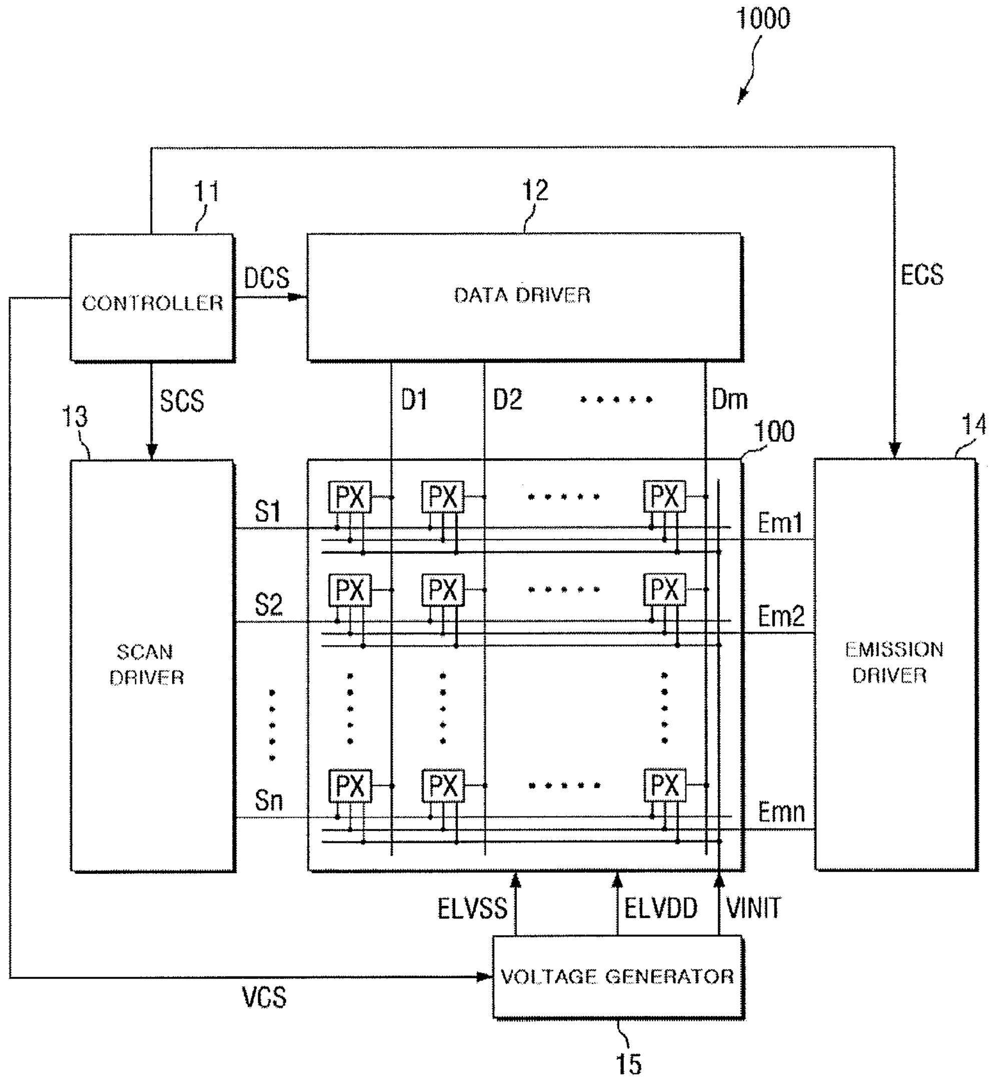
FIG. 1 illustrates an embodiment of a display device.

Example embodiments are described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. In the drawings, the dimensions of layers and regions may be exaggerated for clarity of illustration. Like reference numerals refer to like elements throughout.

It will be understood that when an element or layer is referred to as being “on,” or “connected to” another element or layer, it can be directly on or connected to the other element or layer or intervening elements or layers may be present. In contrast, when an element is referred to as being “directly on” or “directly connected to” another element or layer, there are no intervening elements or layers present. As used herein, the term “and/or” includes any and all combinations of one or more of the associated listed items.

FIG. 1 illustrates an embodiment of a display device 1000 which includes a display panel 100. The display panel 100 include a plurality of pixels PX, and interconnections for transmitting signals to the pixels PX. The pixels PX are arranged in a matrix. Each pixel PX emits one of red light, green light, or blue light. The emission of light by the pixels PX are controlled by first through n-th scan signals S1, S2, . . . , Sn, first through m-th data signals D1, D2, . . . , Dm, and first through n-th emission signals Em1, Em2, . . . , Emn. The first through n-th scan signals S1, S2, Sn control the pixels PX to receive, or not to receive, the first through m-th data signals D1, D2, . . . , Dm. The first through m-th data signals D1, D2, . . . , Dm include information relating to the luminance of light emitted by the pixels PX. The first through m-th emission signals Em1, Em2, . . . , Emn control the emission of light by the pixels PX.

The interconnections include interconnections for transmitting the first through n-th scan signals S1, S2, . . . , Sn, the first through m-th data signals D1, D2, . . . , Dm, the first through m-th emission signals Em1, Em2, . . . , Emn, and an initialization voltage VINIT. The interconnections for transmitting the first through n-th scan signals S1, S2, . . . , Sn and the first through m-th emission signals Em1, Em2, . . . , Emn extend in a row direction of the pixels PX. The interconnections for transmitting the first through m-th data signals D1, D2, . . . , Dm extend in a column direction of the pixels PX. The interconnections for transmitting the initialization voltage MIT extend in the row direction of the pixels PX. The interconnections for transmitting the initialization voltage VINIT may be formed in a predetermined shape, e.g., a zigzag shape.

The organic light-emitting display device 1000 also includes a driver unit and a power generator 15. The driver unit includes a controller 11, a data driver 12, a scan driver 13, and an emission driver 14. The controller 11 receives image data from an external source, and generates a scan driver control signal SCS for controlling the scan driver 13, a data driver control signal DCS for controlling the data driver 12, and an emission driver control signal ECS for controlling the emission driver 14, based on the received image data.

The data driver 12 receives the data driver control signal DCS, and generates the first through m-th data signals D1, D2, . . . , Dm based on the data driver control signal DCS.

The scan driver 13 receives the scan driver control signal SCS, and generates the first through n-th scan signals S1, S2, . . . , Sn based on the scan driver control signal SCS.

The emission driver 14 receives the emission driver control signal ECS, and generates the first through n-th emission signals Em1, Em2, . . . , Emn based on the emission driver control signal ECS.

The power generator 15 generates the initialization voltage VINIT, a first power source voltage ELVDD, and a second power source voltage ELVSS. The power generator 15 provides the initialization voltage VINIT, the first power source voltage ELVDD, and the second power source voltage ELVSS to the display panel 100. In one embodiment, the initialization voltage VINIT, the first power source voltage ELVDD, and the second power source voltage ELVSS may be variable. The controller 11 controls the power generator 15 to vary the initialization voltage VINIT, the first power source voltage ELVDD, and the second power source voltage ELVSS.

Figure 2:
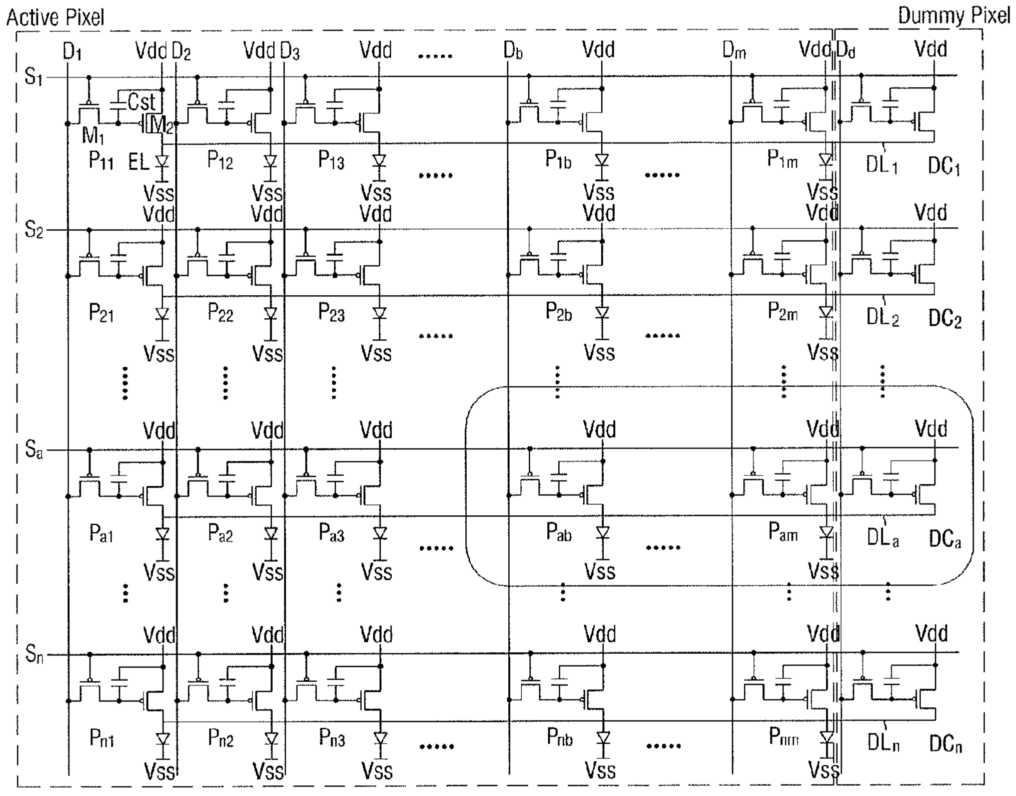
FIG. 2 illustrates an embodiment of a pixel array.

FIG. 2 illustrates an embodiment of a pixel array which may be included in the display device 100 of FIG. 1. Referring to FIG. 2, a substrate includes a dummy region near a pixel array region. A plurality of pixels $P_{11}$, $P_{12}$, . . . , $P_{nm}$ are arranged in the pixel array region, and a plurality of dummy cells $DC_1$, $DC_2$, . . . , $DC_a$, . . . , $DC_n$ are arranged in the dummy region. A plurality of scan lines $S_1$, $S_2, \ldots, S_a, \ldots, S_n$ are arranged in the pixel array region and the dummy region in one direction.

Additionally, in the pixel array region, a plurality of data lines $D_1, D_2, \ldots, D_b, \ldots, D_m$ intersect the scan lines $S_1, S_2, \ldots, S_a, \ldots, S_n$. As a result, the pixels P11, P12, . . . , Pnm are locations which correspond to intersections between the scan lines $S_1, S_2, \ldots, S_a, \ldots, S_n$ and the data lines $D_1, D_2, \ldots, D_b, \ldots, D_m$. A dummy data line $D_d$ is arranged in the dummy region to intersect the scan lines $S_1, S_2, \ldots, S_a, \ldots, S_n$. As a result, the dummy cells $DC_1, DC_2, \ldots, DC_a, \ldots, DC_n$ are at locations which correspond to intersections between the scan lines $S_1, S_2, \ldots, S_a, \ldots, S_n$ and the dummy data line $D_d$.

Each of the pixels $P_{11}, P_{12}, \ldots, P_{nm}$ includes a pixel driving circuit electrically connected to a pixel electrode. An organic functional layer, including at least an organic light-emitting layer, and an opposing electrode are sequentially disposed above the pixel electrode, to thereby form a light-emitting device (EL). The pixel driving circuit may include a switching transistor T1, a capacitor Cst, and a driving transistor T2. The gate terminal of the switching transistor T1 may be connected to one of the scan lines $S_1, S_2, \ldots, S_a, \ldots, S_n$, and the source terminal of the switching transistor T1 may be connected to one of the data lines $D_1, D_2, \ldots, D_b, \ldots, D_m$. Accordingly, the switching transistor T1 may switch a data signal applied to a corresponding one of the data lines $D_1, D_2, \ldots, D_b, \ldots, D_m$ in accordance with a scan signal applied to a corresponding one of the scan lines $S_1, S_2, \ldots, S_a, \ldots, S_n$.

The capacitor Cst is connected between the drain terminal of the switching transistor T1 and a common power line Vdd. In operation, the capacitor Cst maintains the data signal for a predetermined amount of time. The gate terminal of the driving transistor T2 is connected to the capacitor Cst, the source terminal of the driving transistor T2 is connected to the common power line Vdd, and the drain terminal of the driving transistor T2 is connected to the EL device. Accordingly, the driving transistor T2 applies a current corresponding to the data signal applied to the switching transistor T1 to the pixel electrode. The EL device emits light based on current applied thereto.

Each of the dummy cells $DC_1, DC_2, \ldots, DC_a, \ldots, DC_n$ includes a dummy driving circuit for applying electric signals to a corresponding pixel electrode. The dummy driving circuit is connected to one of the scan lines $S_1, S_2, \ldots, S_a, \ldots, S_n$, to the dummy data line $D_d$, and to the common power line Vdd.

Like a pixel driving circuit, the dummy driving circuit may include a switching transistor T1, a capacitor Cst, and a driving transistor T2. The gate terminal of the switching transistor T1 may be connected to one of the scan lines $S_1, S_2, \ldots, S_a, \ldots, S_n$, and the source terminal of the switching transistor T1 may be connected to the dummy data line $D_d$. Accordingly, the switching transistor T1 may switch a data signal applied to the dummy data line $D_d$ in accordance with a scan signal applied to one of the scan lines $S_1, S_2, \ldots, S_a, \ldots, S_n$ connected thereto.

The capacitor Cst may be connected between the drain terminal of the switching transistor T1 and the common power line Vdd. The capacitor Cst may maintain the data signal for a predetermined amount of time. The gate terminal of the driving transistor T2 may be connected to the capacitor Cst, and the source terminal of the driving transistor T2 may be connected to the common power line Vdd.

A plurality of dummy lines $DL_1, DL_2, \ldots, DL_a, \ldots, DL_n$ are in the dummy region. The dummy lines $DL_1, DL_2, \ldots, DL_a, \ldots, DL_n$ may be electrically connected to the dummy driving circuits of the dummy cells $DC_1, DC_2, \ldots, DC_a, \ldots, DC_n$, respectively, and particularly the drain terminals of the driving transistors T2 of respective ones of the dummy cells $DC_1, DC_2, \ldots, DC_a, \ldots, DC_n$. The dummy lines $DL_1, DL_2, \ldots, DL_a, \ldots, DL_n$ extend into the pixel array region, and may be disposed below the pixel electrodes of the pixels $P_{11}, P_{12}, \ldots, P_{nm}$. The pixel electrodes of the pixels $P_{11}, P_{12}, \ldots, P_{nm}$ may overlap the dummy lines $DL_1, DL_2, \ldots, DL_a, \ldots, DL_n$, respectively.

During the fabrication of an organic light-emitting display device, defects may occur in the pixel driving circuits of some pixels. When this occurs, the EL devices connected to the defective pixel driving circuits may not emit light when turned on or may emit light even when turned off, thereby causing dark- or bright-spot defects.

The interconnections between the defective pixel driving circuits and their respective EL devices may be cut off. For example, in response to a pixel $P_{ab}$ becoming defective due to a defect in a pixel driving circuit thereof, the interconnection between the pixel driving circuit and an EL device of the pixel $P_{ab}$ (and particularly the interconnection between a driving transistor T2 and the EL device of the pixel $P_{ab}$) may be cut off.

When no electrical signals are transmitted to the EL device of the pixel $P_{ab}$ due to the defect in the pixel driving circuit of the pixel $P_{ab}$, the interconnection between the pixel driving circuit and the EL device of the pixel $P_{ab}$ may not be cut off. Thereafter, the pixel electrode of the pixel $P_{ab}$ may be electrically connected to the dummy line $DL_a$, which is disposed below the pixel electrode of the pixel $P_{ab}$, using, for example, a laser repair method. As a result, the pixel electrode of the pixel $P_{ab}$, may be electrically connected to the dummy driving circuit in the dummy cell $DC_a$. The pixel $P_{ab}$ may then be driven by selecting the scan line $S_a$ and applying a data voltage to the dummy data line $D_d$. Accordingly, the pixel $P_{ab}$ may not experience a bright- or dark-spot defect.

Figure 3:
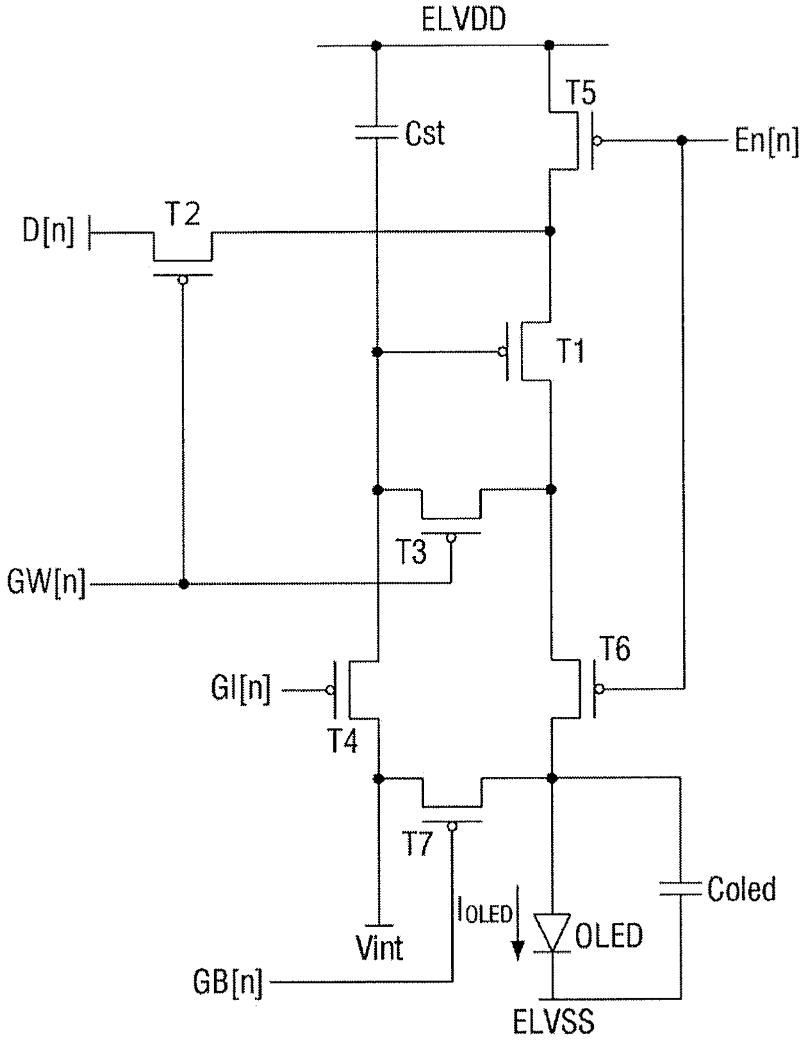
FIG. 3 illustrates an embodiment of a pixel.

FIG. 3 illustrates an embodiment of a pixel, which, for example, may be in the display device 1000 (e.g., an organic light-emitting display device) of FIG. 1. Referring to FIG. 3, the pixel includes a plurality of thin-film transistors (TFTs), to which a plurality of signals may be applied, a storage capacitor Cst, and an organic light-emitting diode (OLED).

The TFTs include a first TFT T1 (e.g., a driving TFT), a second TFT T2 (e.g., a switching TFT), a third TFT T3, a fourth TFT T4, a fifth TFT T5, a sixth TFT T6, and a seventh TFT T7. The plurality of signals that may be applied to the TFTs may include a scan signal GW[n], a previous scan signal GB[n], an emission control signal EN[n], a data signal D[n], a first power source voltage ELVDD, a second power source voltage ELVSS, an initialization voltage Vint, and a black voltage signal GB[n].

The gate terminal of the first driving TFT T1 may be connected to a first end of the storage capacitor Cst. The source terminal of the first driving TFT T1 may be connected to the first power source voltage ELVDD via the fifth TFT T5. The drain terminal of the first driving TFT T1 may be electrically connected to the anode of the OLED via the sixth TFT T6. The first driving TFT T1 may receive the data signal D[n] in accordance with a switching operation performed by the second TFT T2, and may apply a driving current to the OLED.

The gate terminal of the second TFT T2 may receive the scan signal GW[n]. The source terminal of the second TFT T2 may receive the data signal D[n]. The drain terminal of the second TFT T2 may be connected to the source terminal of the first TFT T1, and may receive the first power source voltage ELVDD via the fifth TFT T5. The second TFT T2 may be turned on by the scan signal GW[n], and thus may perform a switching operation to transmit the data signal D[n] to the source terminal of the first TFT T1.

The gate terminal of the third TFT T3 may receive the scan signal GW[n]. The source terminal of the third TFT T3 may be connected to the drain terminal of the first TFT T1, and may also be connected to the anode of the OLED via the sixth TFT T6. The drain terminal of the third TFT T3 may be connected to the first end of the storage capacitor Cst, the drain terminal of the fourth TFT T4, and the gate terminal of the first TFT T1. The third TFT T3 may be turned on by the scan signal GW[n] and may connect the gate terminal and the drain terminal of the first TFT T1, to thereby form a diode connection.

The gate terminal of the fourth TFT T4 may receive the previous scan signal GI[n]. The source terminal of the fourth TFT T4 may receive the initialization voltage Vint. The drain terminal of the fourth TFT T4 may be connected to the first end of the storage capacitor Cst, the drain terminal of the third TFT T3, and the gate terminal of the first TFT T1. The fourth TFT T4 may be turned on by the previous scan signal GI[n], and may transmit the initialization voltage Vint to the gate terminal of the first TFT T1 to perform an operation for initializing the voltage at the gate terminal of the first TFT T1.

The gate terminal of the fifth TFT T5 may receive the emission control signal En[n]. The source terminal of the fifth TFT T5 may receive the first power source voltage ELVDD. The drain terminal of the fifth TFT T5 may be connected to the source terminal of the first TFT T1 and the drain terminal of the second TFT T2.

The gate terminal of the sixth TFT T6 may receive the emission control signal En[n]. The source terminal of the sixth TFT T6 may be connected to the drain terminal of the first TFT T1 and the source terminal of the third TFT T3. The drain terminal of the sixth TFT T6 may be electrically connected to the anode of the OLED and the drain terminal of the seventh TFT T7. The fifth TFT T5 and the sixth TFT T6 may be turned on at the same time by the emission control signal En[n]. As a result, the first power source voltage ELVDD may be transmitted to the OLED so that a driving current flows in the OLED.

The gate terminal of the seventh TFT T7 may receive the black voltage signal GB[n]. The source terminal of the seventh TFT T7 may receive the initialization voltage Vint. The drain terminal of the seventh TFT T7 may be connected to the anode of the OLED and the drain terminal of the sixth transistor T6. The seventh TFT T7 may be turned on by the black voltage signal GB[n], and may thus transmit the initialization voltage Vint to the anode of the OLED to apply a black voltage.

A second end of the storage capacitor Cst may be connected to the first power source voltage ELVDD. The cathode of the OLED may be connected to the second power source voltage ELVSS. Accordingly, the OLED may receive a driving current from the first TFT T1 and may therefore emit light for displaying an image.

Figure 4:
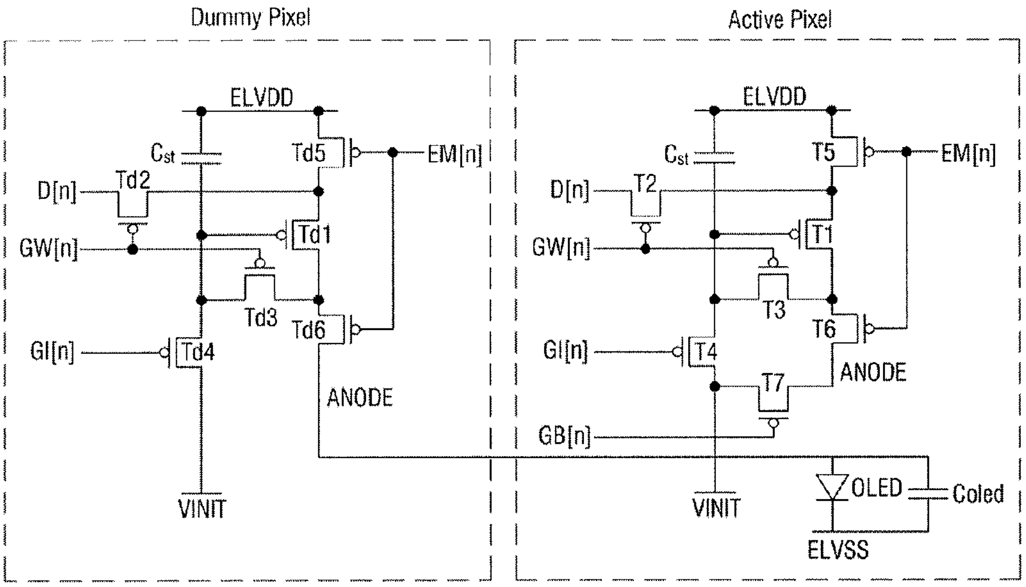
FIG. 4 illustrates an example of an active pixel and a dummy pixel.

FIG. 4 illustrates an example of an active pixel and a dummy pixel, which, for example, may be included in of the display device 1000 of FIG. 1. Referring to FIG. 4, a dummy driving circuit and a pixel driving circuit may have the same structure. During the fabrication of the organic light-emitting display device, defects may occur in the pixel driving circuits of some pixels. When this occurs, interconnections between the defective pixel driving circuits and their respective OLEDs may be cut off. For example, the drain terminals of a sixth transistor T6 and a seventh transistor T7 may be open to the anode of an OLED, and the drain terminal of a sixth dummy transistor Td6 of the dummy driving circuit may be connected to the anode of the OLED.

The dummy driving circuit is illustrated in FIG. 4 as not including a seventh dummy transistor Td7, but this transistor may be included in other embodiments. That is, the dummy driving circuit may include the seventh dummy transistor Td7. When no electrical signals are transmitted to the OLED due to a defect in the pixel driving circuit, the interconnection between the pixel driving circuit and the OLED may not be cut off. An embodiment of a method for detecting and repairing a defective pixel driving circuit will be described with reference to FIG. 5.

Figure 5:
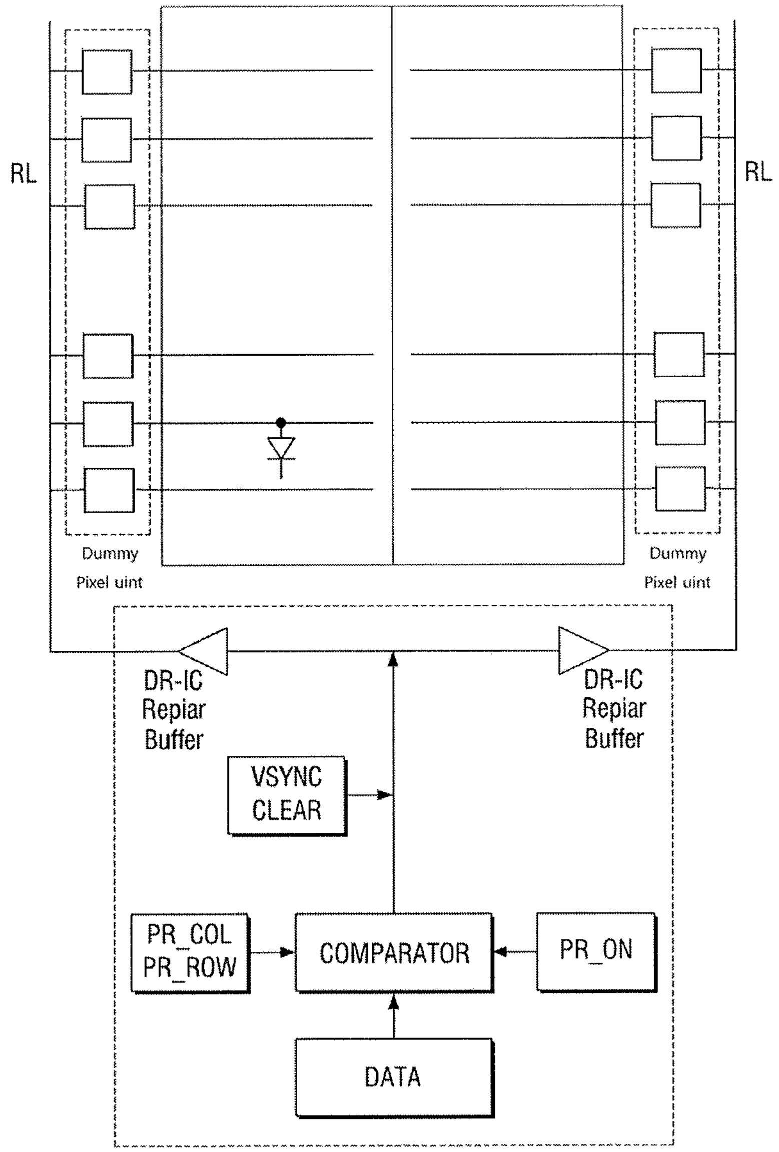
FIG. 5 illustrates an embodiment of a controller for a display device.

FIG. 5 illustrates an embodiment of a controller 11 of a display device, which, for example, may be display device 1000 of FIG. 1. Referring to FIG. 5, two dummy pixel units may be provided on respective sides of a display panel 100. The dummy pixel units may be connected to the controller 11 via a repair line RL.

Each of the dummy pixel units may include a plurality of dummy driving circuits, which are provided for a plurality of scan lines, respectively. The dummy pixel units are illustrated in FIG. 5 as being provided on respective ends of the scan lines, but may be provided not only on either end of the scan lines but also on either end of a plurality of data lines.

The controller 11 may apply data DATA to each pixel driving circuit, and may receive defect data PR_ON indicating whether each pixel driving circuit is defective from a sensing device. The sensing device may receive defect location data (PR_COL, PR_ROW) indicating the location of a pixel driving circuit where a defect has occurred. A comparator 115 of the controller 11 may determine the location of the defective pixel driving circuit and the size of data to be applied to the defective pixel driving circuit based on the defect data PR_ON and the defect location data (PR_COL, PR_ROW). The comparator 115 applies a signal corresponding to the results of the determination to the repair line RL. The signal applied by the comparator 115 to the repair line RL may be provided to the repair line RL, together with a synchronization signal Vsync to be output in synchronization with a data signal, which is to be provided via the data lines. The signal applied by the comparator 115 to the repair line RL may be provided to the repair line RL via repair buffers DR-IC Repair Buffer. The detection of a defective pixel driving circuit and the application of data to the defective pixel driving circuit may be performed in a different way in other embodiments.

Figure 6:
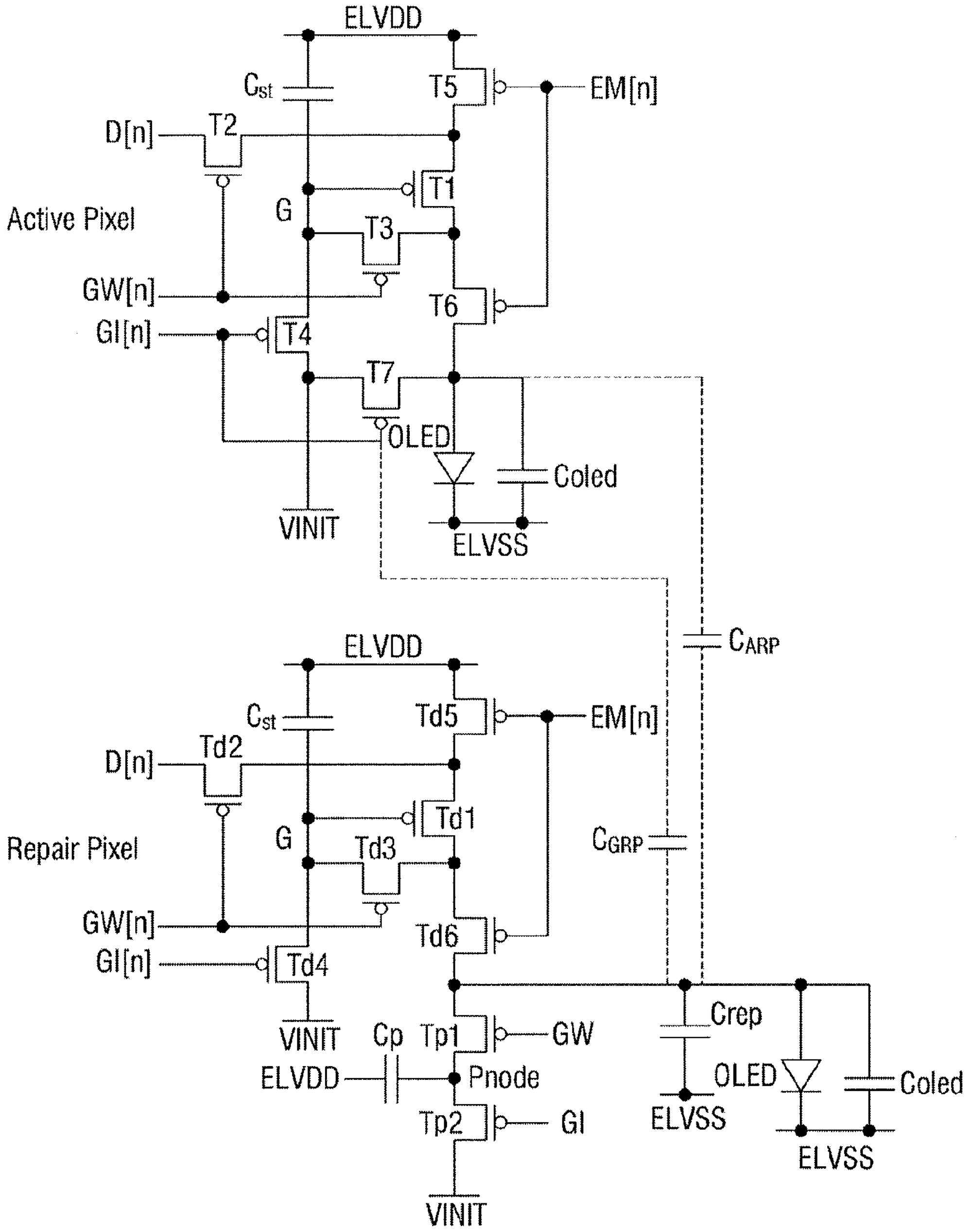
FIG. 6 illustrates another example of an active pixel and a dummy pixel.

FIG. 6 illustrates another example of an active pixel and a dummy pixel of the display device 1000 of FIG. 1. Referring to FIG. 6, the gate terminals of a fourth transistor T4 and a seventh transistor T7 of a pixel driving circuit may be electrically connected together. The fourth transistor T4 and the seventh transistor T7 may be driven by the same signal, e.g., an initialization signal GI[n] or a black voltage signal GB [n].

The pixel driving circuit and a dummy driving circuit may be connected to each other by a repair line RL and a black voltage line BL. Because the pixel driving circuit and the dummy driving circuit are connected by the repair line RL, data may continue to be applied to an OLED of the pixel driving circuit even when a defect occurs in the pixel driving circuit.

The dummy driving circuit and the pixel driving circuit may be connected by the repair line RL. The repair line RL extends in a row direction to overlap the pixel driving circuit. The repair line RL overlaps the pixel driving circuit. An anode parasitic capacitor $C_{ARP}$ with a very large capacitance may be generated at the repair line RL.

In response to generation of the anode parasitic capacitor $C_{ARP}$, a pixel electrode and the repair line RL may be coupled together at a predetermined voltage. As a result, a boost voltage VBST may be generated at the anode of the pixel driving circuit. The boost voltage VBST boosts the voltage to be applied to the anode of the pixel driving circuit. As a result, the voltage at the anode of the OLED may become higher than the voltage at the cathode of the OLED, regardless of the application of a black signal. This may cause a slightly bright defect.

An initialization line and the black voltage line BL may be formed parallel to the repair line RL. Due to the initialization line, the black voltage line BL, and the repair line RL, fringe capacitance may be generated to affect the pixel driving circuit. That is, due to the initialization line, the black voltage line BL, and the repair line RL, a black parasitic capacitor $C_{GRP}$ may be generated.

Unlike its counterpart in FIG. 4, he dummy driving circuit may further include a first pumping transistor Tp1, which is connected to the anode of the dummy driving circuit, a second pumping transistor Tp2, and a pumping capacitor Cp.

The gate terminal of the first pumping transistor Tp1 may receive a scan signal GW[n]. The source terminal of the first pumping transistor Tp1 may be connected to the anode of the dummy driving circuit. The drain terminal of the first pumping transistor Tp1 may be connected to the source terminal of the second pumping transistor Tp2 via a pumping node Pnode.

The gate terminal of the second pumping transistor Tp2 may receive the initialization signal GI[n]. The source terminal of the second pumping transistor Tp2 may be connected to the drain terminal of the first pumping transistor Tp1 via the pumping node Pnode. The drain terminal of the second pumping transistor Tp2 may receive an initialization voltage VINIT.

The pumping capacitor Cp may connect the pumping node Pnode and a terminal to which a first power source voltage ELVDD is applied. The first pumping transistor Tp1 may connect the anode of the dummy driving circuit and the pumping capacitor Cp based on the receipt of the scan signal GW[n], and thus may lower the amount of charges the anode parasitic capacitor $C_{APR}$ is charged with. That is, by connecting the anode parasitic capacitor $C_{APR}$ and the pumping capacitor Cp in parallel, the first pumping transistor Tp1 may perform charge sharing, and may therefore allow the amount of charges the anode parasitic capacitor $C_{APR}$ is charged with to be shared.

In response to the initialization signal GI[n], the second pumping transistor Tp2 may apply the initialization voltage VINIT to the pumping node Pnode. A first end of the pumping capacitor Cp may be connected to the pumping node Pnode. A second end of the pumping capacitor Cp may be connected to the terminal to which the first power source voltage ELVDD is applied. Alternatively, the second end of the pumping capacitor Cp may be connected to another terminal to which a constant voltage is applied. In another embodiment, the second pumping transistor Tp2 may be omitted.

Figure 7:
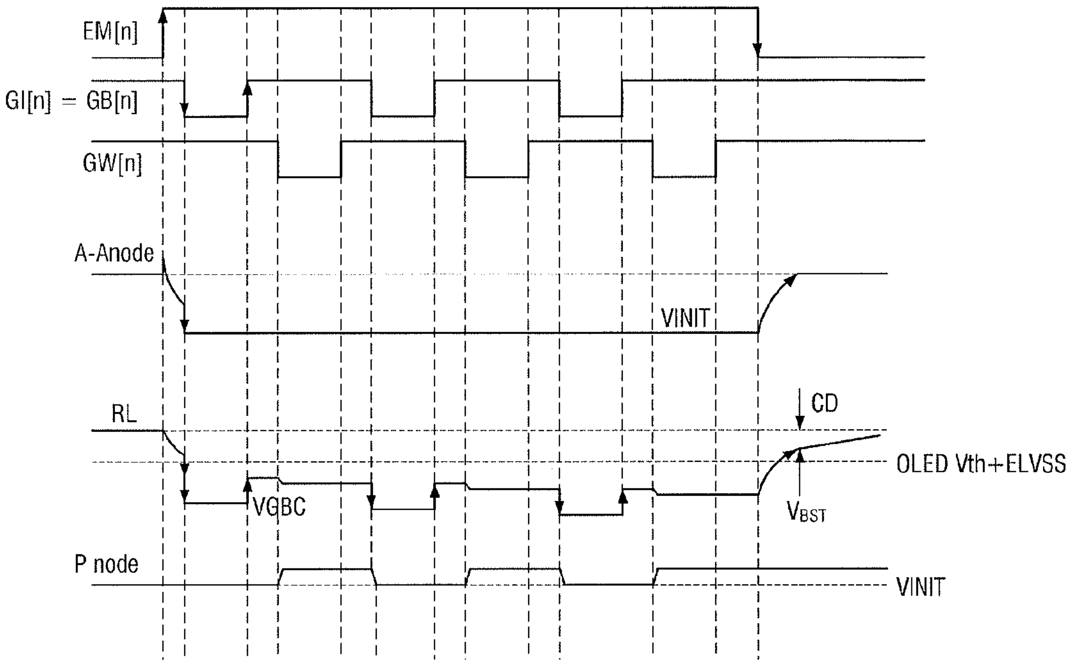
FIG. 7 illustrates example variations in levels of signals for a display device.

FIG. 7 is a timing diagram illustrating an example of variations in the levels of signals applied to the display device of FIG. 1. Referring to FIG. 7, in response to a high-level emission control signal EM[n], a voltage A-Anode at the anode of the pixel driving circuit may exponentially decrease, e.g., may drop to as low as the initialization voltage VINIT upon application of the initialization signal GI[n]. In response to a low-level emission control signal EM[n], the voltage A-Anode may increase. The voltage A-Anode is not affected by the initialization signal GI[n] and the scan signal GW[n].

Due to presence of the anode parasitic capacitor $C_{ARP}$ and the black parasitic capacitor $C_{GRP}$, the voltage of the repair line RL may be coupled to, and thus may vary along with, individual signals applied to the dummy driving circuit, for example, the initialization signal GI[n] and the scan signal GW[n].

Due to the black parasitic capacitor CGRP, the voltage of the repair line RL may increase by as much as an incremental voltage VGBC.

In response to a low-level scan signal GW[n] applied after application of a low-level black voltage signal GB[n], the pumping capacitor Cp and the repair line RL may be connected together. As a result, the pumping capacitor Cp may share at least some of the charges that the anode parasitic capacitor $C_{ARP}$ is charged with. Accordingly, the voltage of the repair line RL may slightly decrease.

In response to the low-level black voltage signal GB[n] being applied again, the voltage of the repair line RL may drop to as low as the initialization voltage VINIT.

Thereafter, in response to the emission control signal EM[n] dropping to its low level again, the voltage of the repair line may increase, but the speed at which the repair line RL is charged may be low due to the pumping capacitor Cp. As a result, when the black voltage signal GB[n] or a low-grayscale signal is applied, the voltage of the anode of the OLED may be maintained to be a charge-down voltage CD lower than the voltage of the cathode of the OLED. That is, the occurrence of slightly bright defects at low grayscale values may be prevented.

The voltage at the pumping node Pnode may be maintained to be as low as the initialization voltage VINIT. However, because the anode parasitic capacitor $C_{ART}$ and the pumping capacitor Cp are connected by the scan signal GW[n], the voltage at the pumping node Pnode may slightly increase, but may drop back to as low as the initialization voltage VINIT due to the black voltage signal GB[n] applied to the second pumping transistor Tp2.

In FIG. 7, the scan signal GW[n] and the black voltage signal GB[n] are applied three times, while the emission control signal EM[n] is maintained at its high level. In another embodiment, the scan signal GW[n] and the black voltage signal GB[n] may be applied more or less than three times.

Figure 8:
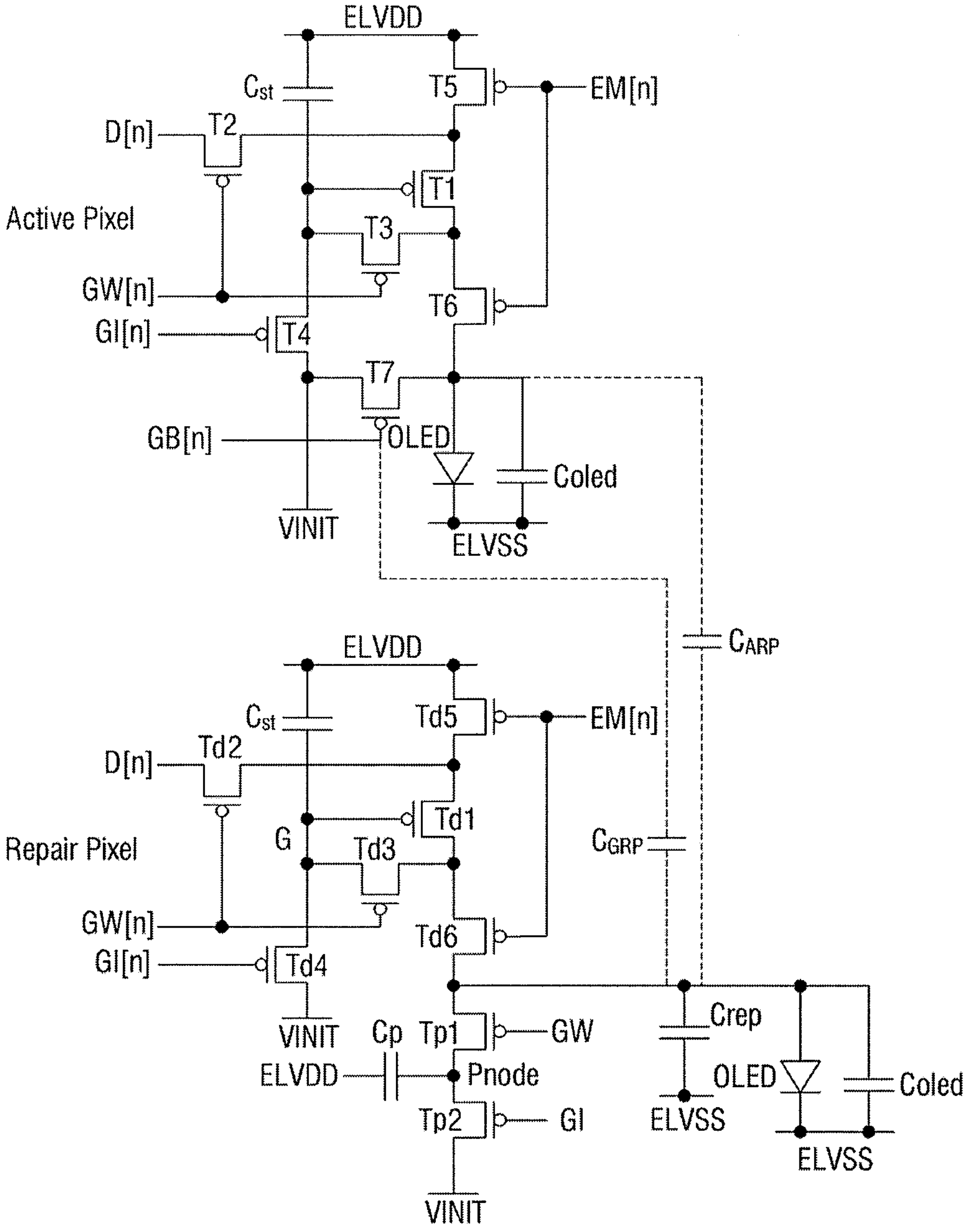
FIG. 8 illustrates another example of an active pixel and a dummy pixel.
Figure 9:
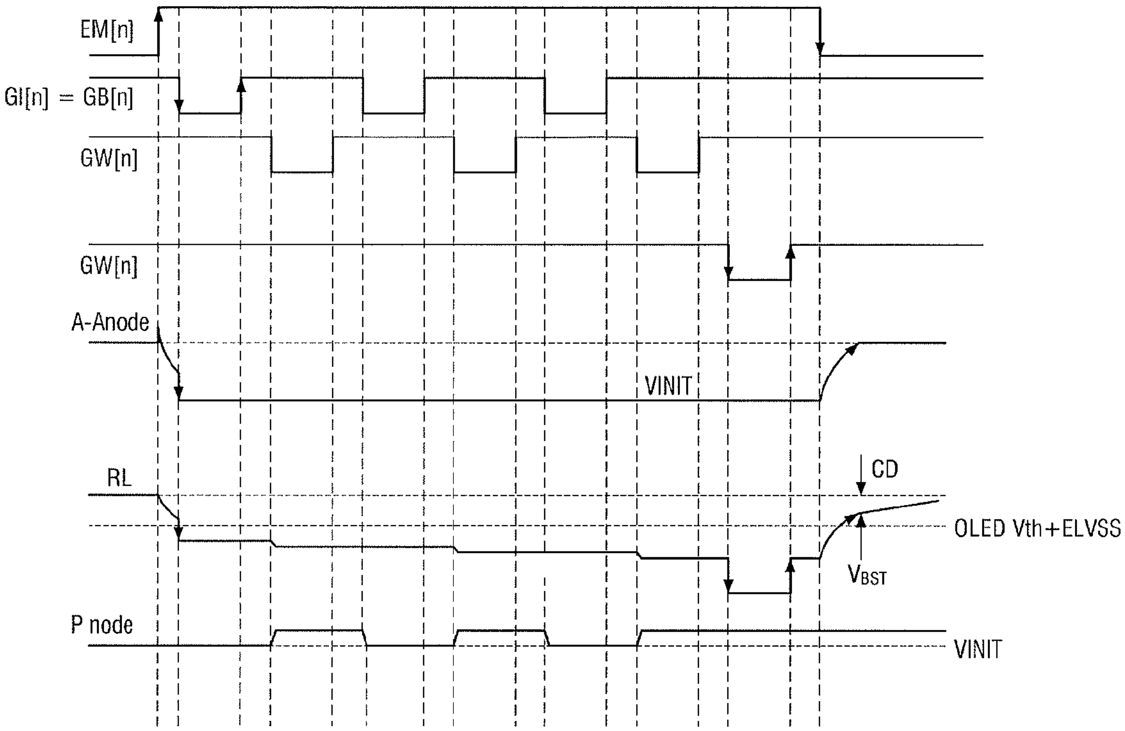
FIG. 9 illustrates a timing diagram illustrating variations in the levels of signals applied to the display device according to the exemplary embodiment of FIG. 8.

FIG. 8 illustrates an example of an active pixel and a dummy pixel of the display device, and FIG. 9 is a timing diagram illustrating an example of variations in the levels of signals applied to the display device for the embodiment of FIG. 8. The active pixel and the dummy pixel in FIG. 8 have may structures similar to their respective counterparts in FIG. 6.

Referring to FIG. 8, the gate terminals of a fourth transistor T4 and a seventh transistor T7 of a pixel driving circuit may be electrically isolated from each other. The fourth transistor T4 and the seventh transistor T7 may be driven by an initialization signal GI[n] and a black voltage signal GB[n], respectively. Because the fourth transistor T4 and the seventh transistor T7 are driven by different signals, the timing of the generation of an incremental voltage VGBC by a black parasitic capacitor CGRP may differ. Operations of the pixel driving circuit and a dummy driving circuit will be described with reference to FIG. 9.

Referring to FIG. 9, in response to a high-level emission control signal EM[n] being applied, a voltage A-Anode at the anode of the pixel driving circuit may exponentially decrease, and may drop to as low as an initialization voltage VINIT upon the application of the initialization signal GI[n]. In response to a low-level emission control signal EM[n], the voltage A-Anode may increase. The voltage A-Anode is not affected by the initialization signal GI[n] and a scan signal GW[n].

Due to the presence of an anode parasitic capacitor $C_{ARP}$ and the black parasitic capacitor $C_{GRP}$, the voltage of a repair line RL may be coupled to, and thus may vary along with, individual signals applied to the dummy driving circuit, for example, the initialization signal GI[n] and the scan signal GW[n].

In response to a low-level scan signal GW[n] applied after the application of a low-level initialization signal GI[n], the pumping capacitor Cp and the repair line RL may be connected together. As a result, the pumping capacitor Cp may share at least some of the charges the anode parasitic capacitor $C_{ARP}$ is charged with. Accordingly, the voltage of the repair line RL may slightly decrease.

In response to the low-level scan signal GW[n] being applied again, the pumping capacitor Cp and the repair line RL may be connected again, and the pumping capacitor Cp may share again at least some of the charges that the anode parasitic capacitor $C_{ARP}$ is charged with. Thus, the voltage of the repair line RL may further decrease.

Thereafter, in response to a low-level black voltage signal GB [n], the voltage of the repair line RL may drop by as much as an incremental voltage VGBC to the level of the initialization voltage VINIT due to the black parasitic capacitor $C_{GRP}$. In response to a high-level black voltage signal GB[n], the voltage of the repair line RL may increase by as much as the incremental voltage VGBC due to the black parasitic capacitor $C_{GRP}$.

In response to the emission control signal EM[n] dropping to its low level again, the voltage of the repair line RL may increase, but the speed at which the repair line RL is charged may be low due to the pumping capacitor Cp. As a result, when the black voltage signal GB[n] or a low-grayscale signal is applied, the voltage of the anode of an OLED may be maintained to be a charge-down voltage CD lower than the voltage of the cathode of the OLED. That is, the occurrence of slightly bright defects at low grayscale values may be prevented.

The voltage at a pumping node Pnode may be maintained as low as the initialization voltage VINIT. However, beacuse the anode parasitic capacitor $C_{ART}$ and the pumping capacitor Cp are connected by the scan signal GW[n], the voltage at the pumping node Pnode may slightly increase, but may drop back to the level of the initialization voltage VINIT due to the black voltage signal GB[n] applied to a second pumping transistor Tp2.

In FIG. 9, the scan signal GW[n] and the black voltage signal GB[n] are applied three times, while the emission control signal EM[n] is maintained at its high level. In another embodiment, the scan signal GW[n] and the black voltage signal GB[n] may be applied more or less than three times.

Figure 10:
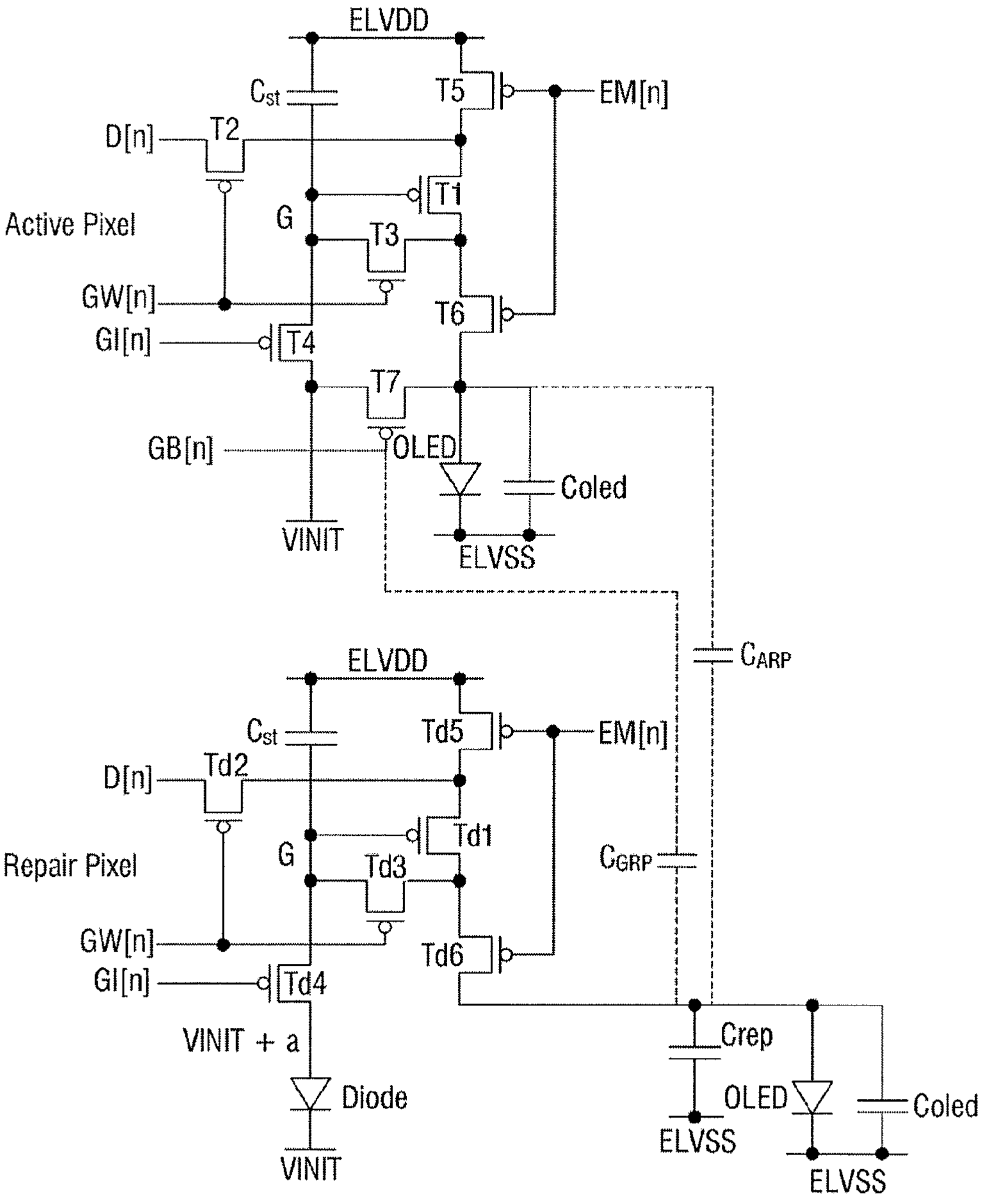
FIG. 10 illustrates another example of an active pixel and a dummy pixel.

FIG. 10 illustrates an example of an active pixel and a dummy pixel of a display device. Referring to FIG. 10, the gate terminals of a fourth transistor T4 and a seventh transistor T7 of a pixel driving circuit may be electrically isolated from each other. The fourth transistor T4 and the seventh transistor T7 may be driven by an initialization signal GI[n] and a black voltage signal GB[n], respectively.

Because the fourth transistor T4 and the seventh transistor T7 are driven by different signals, the timing of the generation of an incremental voltage VGBC by a black parasitic capacitor CGRP may differ from the embodiment of FIG. 6.

The pixel driving circuit and a dummy driving circuit may be connected by a repair line RL and a black voltage line BL. Because the pixel driving circuit and the dummy driving circuit are connected by the repair line RL, data may continue to be applied to an OLED of the pixel driving circuit even when a defect occurs in the pixel driving circuit.

The dummy driving circuit and the pixel driving circuit may be connected by the repair line RL. The repair line RL may extend in a row direction overlapping the pixel driving circuit. Because the repair line RL overlaps the pixel driving circuit, an anode parasitic capacitor CARP with a very large capacitance may be generated at the repair line RL.

In response to the anode parasitic capacitor $C_{ARP}$, a pixel electrode and the repair line RL may be coupled together at a predetermined voltage. As a result, a boost voltage VBST may be generated at the anode of the pixel driving circuit. The boost voltage VBST boosts the voltage to be applied to the anode of the pixel driving circuit. As a result, the voltage at the anode of the OLED may become higher than the voltage at the cathode of the OLED, regardless of the application of a black signal, thereby causing slightly bright defects.

An initialization line and the black voltage line BL may be formed parallel to the repair line RL. Due to the initialization line, the black voltage line BL, and the repair line RL, fringe capacitance may be generated to affect the pixel driving circuit. For example, due to the initialization line, the black voltage line BL, and the repair line RL, a black parasitic capacitor CGRP may be generated.

Unlike its counterpart in FIG. 4, the dummy driving circuit may further include a boost diode Diode connected to a fourth dummy transistor Td4. The anode terminal of the boost diode Diode may be connected to the drain terminal of the fourth dummy transistor Td4. The cathode terminal of the boost diode Diode may be connected to a terminal to which the initialization voltage is applied. Accordingly, the gate-source voltage Vgs of the first dummy transistor Td1 may be lowered. As a result, the current that flows in the anode of the dummy driving circuit and the amount of charges the anode parasitic capacitor $C_{ARP}$ is charged with may both be lowered. As the amount of charges the anode parasitic capacitor $C_{ARP}$ is charged with decreases, the boost voltage VBST may decrease. Therefore, the occurrence of slightly bright defects may be reduced regardless of the application of black data or low-grayscale data.

Figure 11:
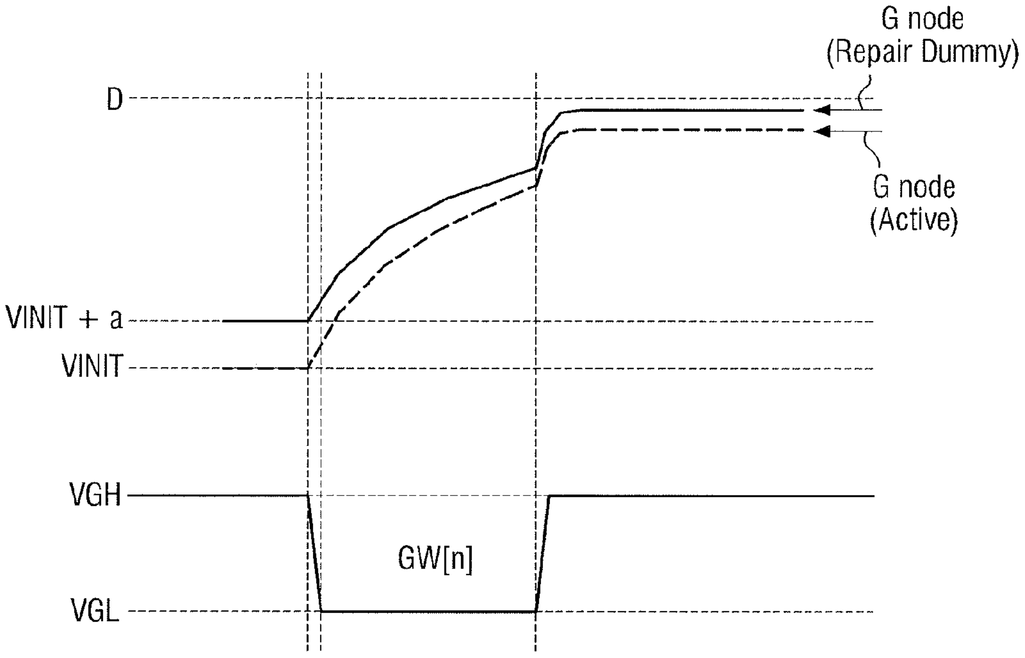
FIG. 11 illustrates example variations in levels of signals for a display device.

FIG. 11 is a timing diagram illustrating an example of variations in the levels of signals applied to the embodiment of FIG. 10. Referring to FIG. 11, in response to a low-level scan signal GW[n], the voltage at a G node Gnode of the dummy driving circuit may increase from a boosted initialization voltage VINIT+a, which is increased from the initialization voltage VINIT due to the boost diode Diode. During the application of the low-level scan signal GW[n], the voltages of the dummy driving circuit and the pixel driving circuit may increase from different levels. Accordingly, the voltage at the G node Gnode of the dummy driving circuit may be maintained to be higher than the voltage at a G node Gnode of the pixel driving circuit.

Because the voltage at the G node Gnode of the dummy driving circuit may be maintained higher than the voltage at the G node Gnode of the pixel driving circuit, not only the gate-source voltage Vgs of the first dummy transistor Td1, but also the driving current that flows in the first dummy transistor Td1, may decrease. Accordingly, the occurrence of slightly bright defects may be reduced regardless of the application of black data or low-grayscale data.

In response to a high-level scan signal GW[n], the voltage at the G node Gnode of the dummy driving circuit or the pixel driving circuit may slightly increase due to the capacitance of a third dummy transistor Td3, which, in the meantime, may or may not be apparent depending on the threshold voltage of the third dummy transistor Td3 and the layout of the circuitry. However, it is assumed that the voltage at the G node Gnode of the dummy driving circuit or the pixel driving circuit is uniformly maintained in response to the application of the high-level scan signal GW[n].

FIGS. 12 to 15 are equivalent circuit diagrams of active pixels and dummy pixels according to other embodiments. The active pixel and the dummy pixel of FIGS. 12, 13, 14, and 15 may have structures similar to their respective counterparts in FIG. 10.

Figure 12:
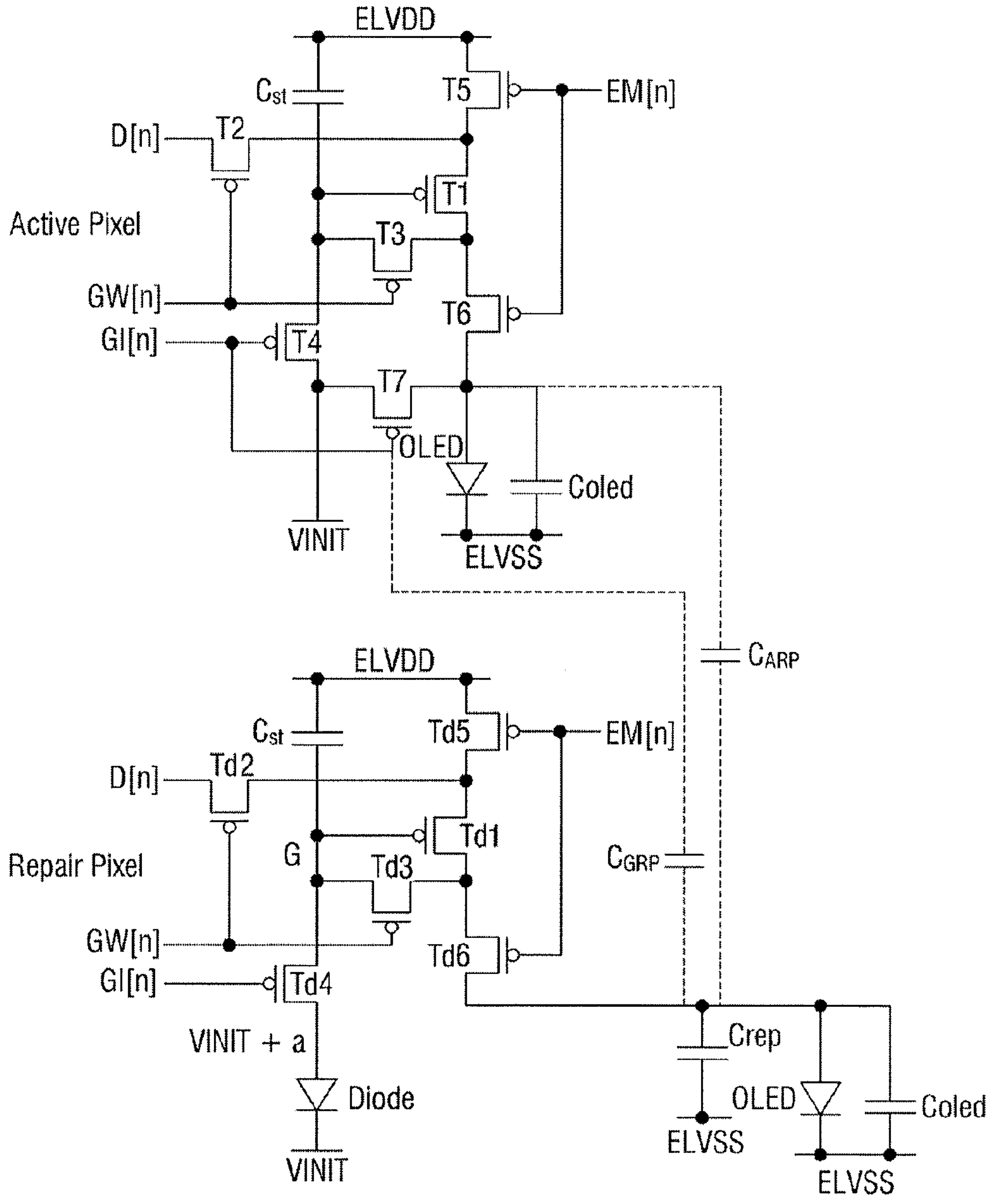
FIGS. 12 to 15 illustrate examples of active pixels and dummy pixels.

Referring to FIG. 12, the gate terminals of a fourth transistor T4 and a seventh transistor T7 of a pixel driving circuit may be electrically connected to each other. The fourth transistor T4 and the seventh transistor T7 may be driven by the same signal, i.e., an initialization signal GI[n] or a black voltage signal GB[n].

Because the gate terminals of the fourth transistor T4 and the seventh transistor T7 are electrically connected together, the voltage of a repair line RL may increase by as much as an incremental voltage VGBC at the rising edge of the initialization signal GI [n].

Figure 13:
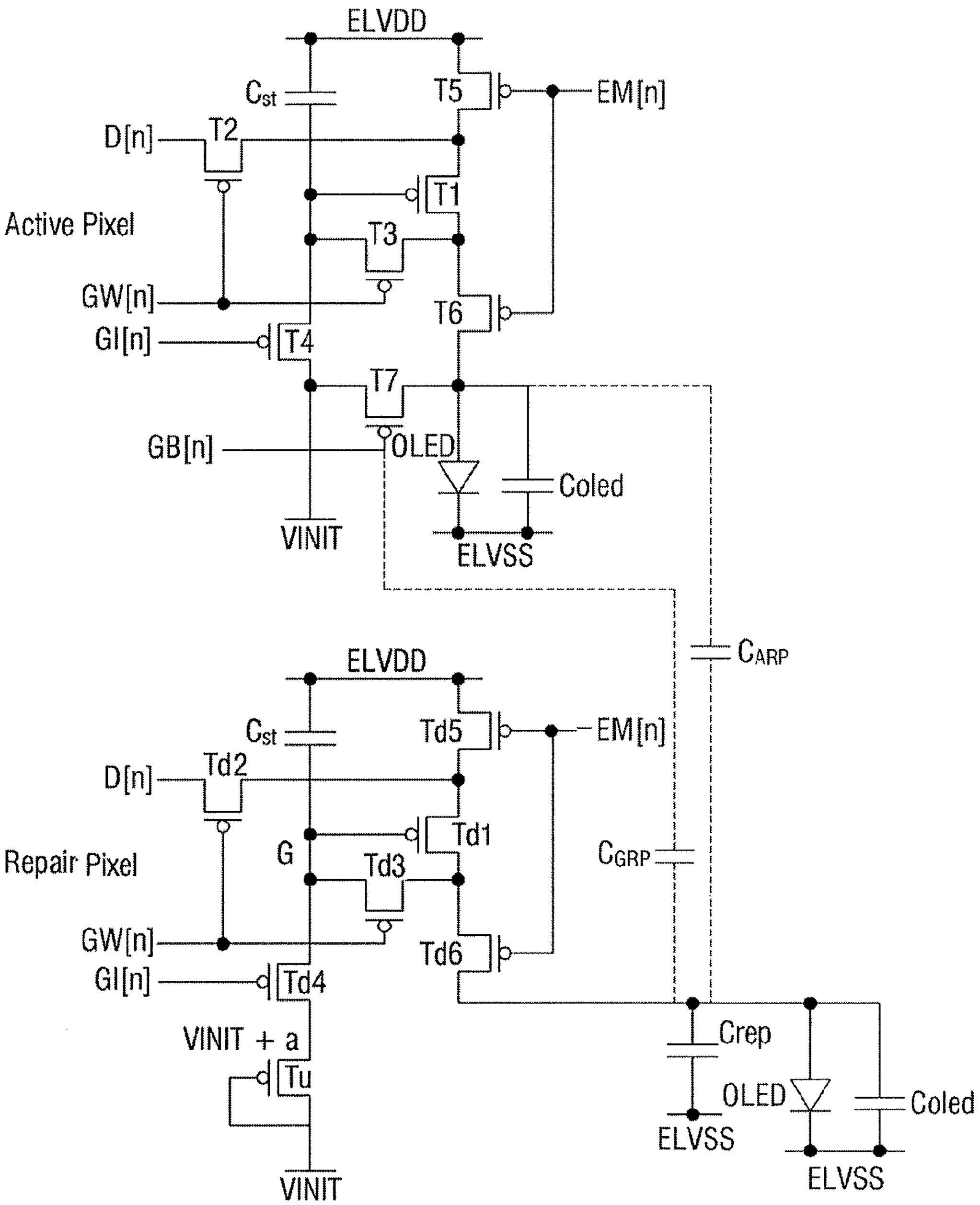

Referring to FIG. 13, a dummy driving circuit may include a boost transistor Tu, instead of the boost diode Diode of FIG. 10. The gate terminal and the drain terminal of the boost transistor Tu may be connected together, thereby forming a diode connection. Due to the diode connection, the boost transistor Tu may serve as a diode, and may apply a boosted initialization voltage VINIT+a, which is increased from an initialization voltage VINIT by as much as the threshold voltage of the boost transistor Tu, to a fourth dummy transistor Td4.

Accordingly, not only the gate-source voltage Vgs of a first dummy transistor Td1, but also the current that flows in the anode of the dummy driving circuit, may decrease. As a result, the amount of charges that an anode parasitic capacitor $C_{ARP}$ is charged with may decrease, and a boost voltage VBST may also decrease. Therefore, the occurrence of slightly bright defects may be reduced regardless of the application of black data or low-grayscale data.

The gate terminals of a fourth transistor T4 and a seventh transistor T7 of a pixel driving circuit are illustrated in FIG. 12 as being electrically isolated from each other. In another embodiment, the gate terminals of the fourth transistor T4 and the seventh transistor T7 of the pixel driving circuit may be connected to each other.

Figure 14:
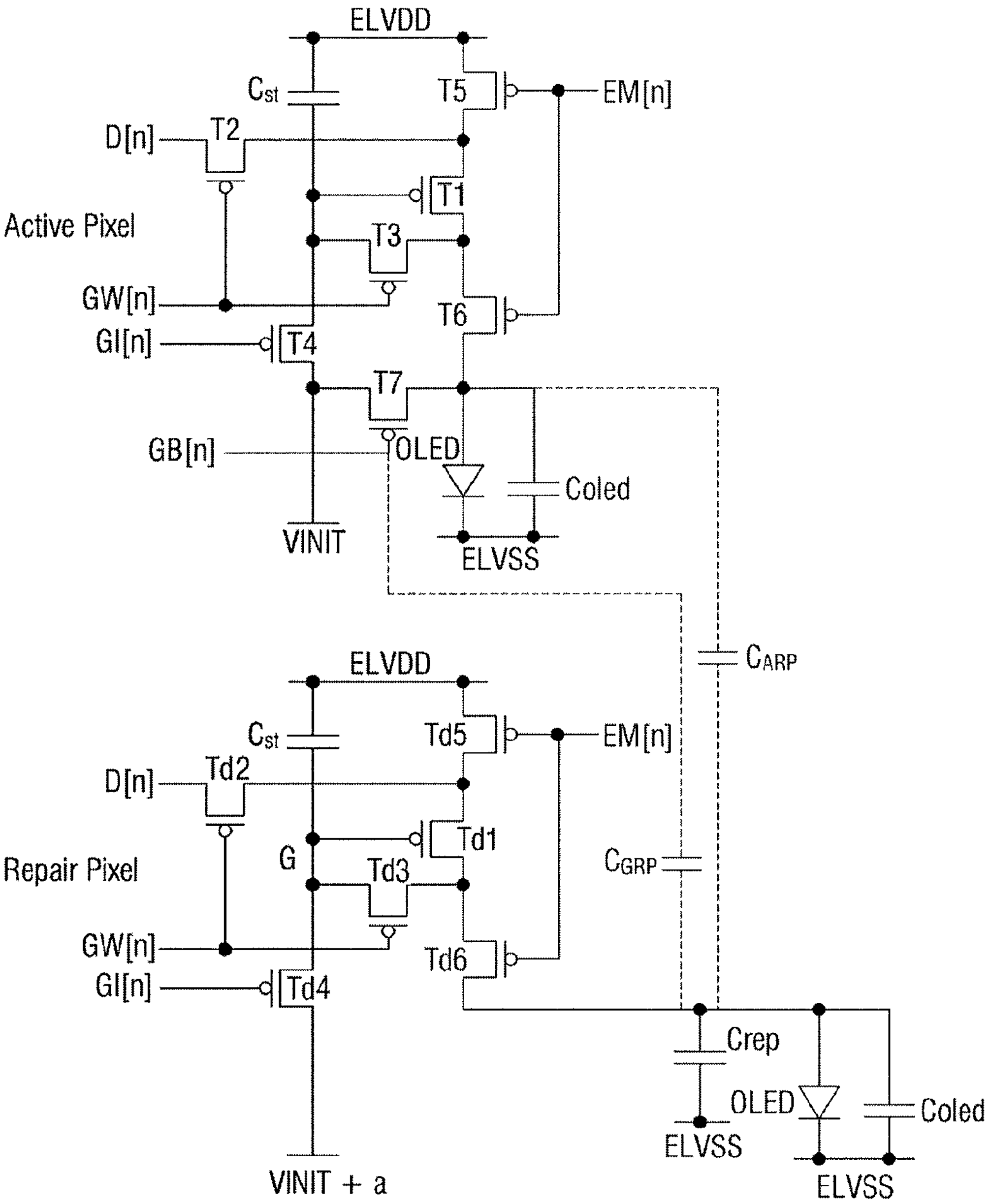

Referring to FIG. 14, a boosted voltage may be directly applied to a fourth dummy transistor Td4 without the aid of the boost diode Diode of FIG. 10. For example, by applying a boosted initialization voltage VINIT+a to the fourth dummy transistor Td4, the gate-source voltage Vgs of a first dummy transistor Td1 may be lowered. As the gate-source voltage Vgs of a first dummy transistor Td1 decreases, not only the current that flows in the anode of a dummy driving circuit, but also the amount of charges that an anode parasitic capacitor $C_{ARP}$ is charged with, may decrease. As a result, a boost voltage VBST may also decrease. Therefore, the occurrence of slightly bright defects may be reduced regardless of the application of black data or low-grayscale data.

Figure 15:
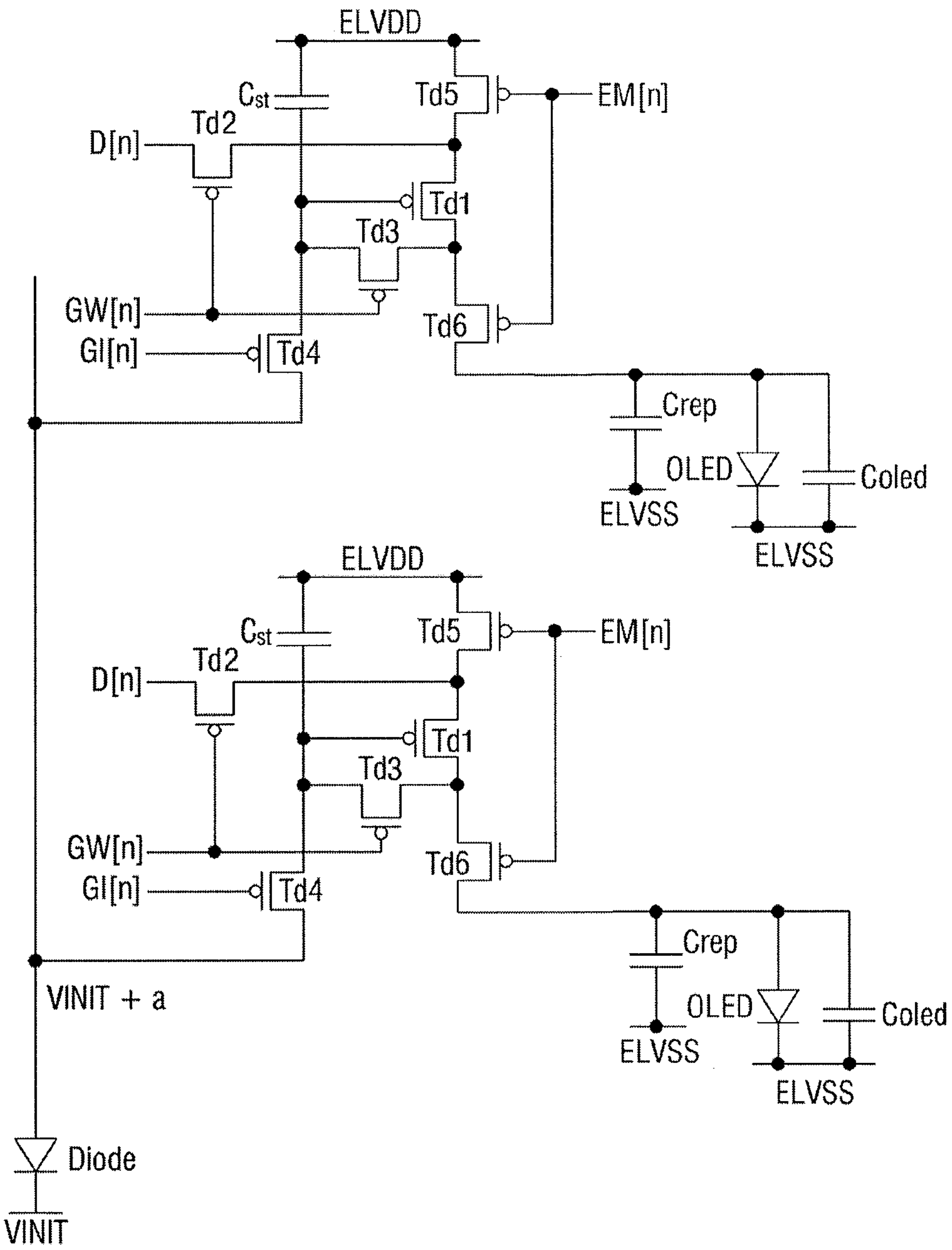

Referring to FIG. 15, a boost diode Diode may be provided for a line of a plurality of pixel driving circuits, but not for a pixel driving circuit. The boost diode Diode may be an additional element provided to apply a boosted initialization voltage higher than an initialization voltage VINIT to a fourth dummy transistor Td4 of each pixel driving circuit. When the fourth dummy transistors Td4 of a plurality of pixel driving circuits are all connected to the anode terminal of the boost diode Diode, the boost diode Diode may lower all the driving currents of the first dummy transistors Td1 of the plurality of pixel driving circuits.

FIG. 15 illustrates an example of the manner in which the boost diode Diode is connected to the plurality of pixel driving circuits. In embodiments, the source terminal of the boost diode Diode may be connected to the drain terminals of the fourth dummy transistors Td4 of the plurality of pixel driving circuits, or a boosted voltage may be applied to the drain terminals of the fourth dummy transistors Td4 of the plurality of pixel driving circuits.

Figure 16:
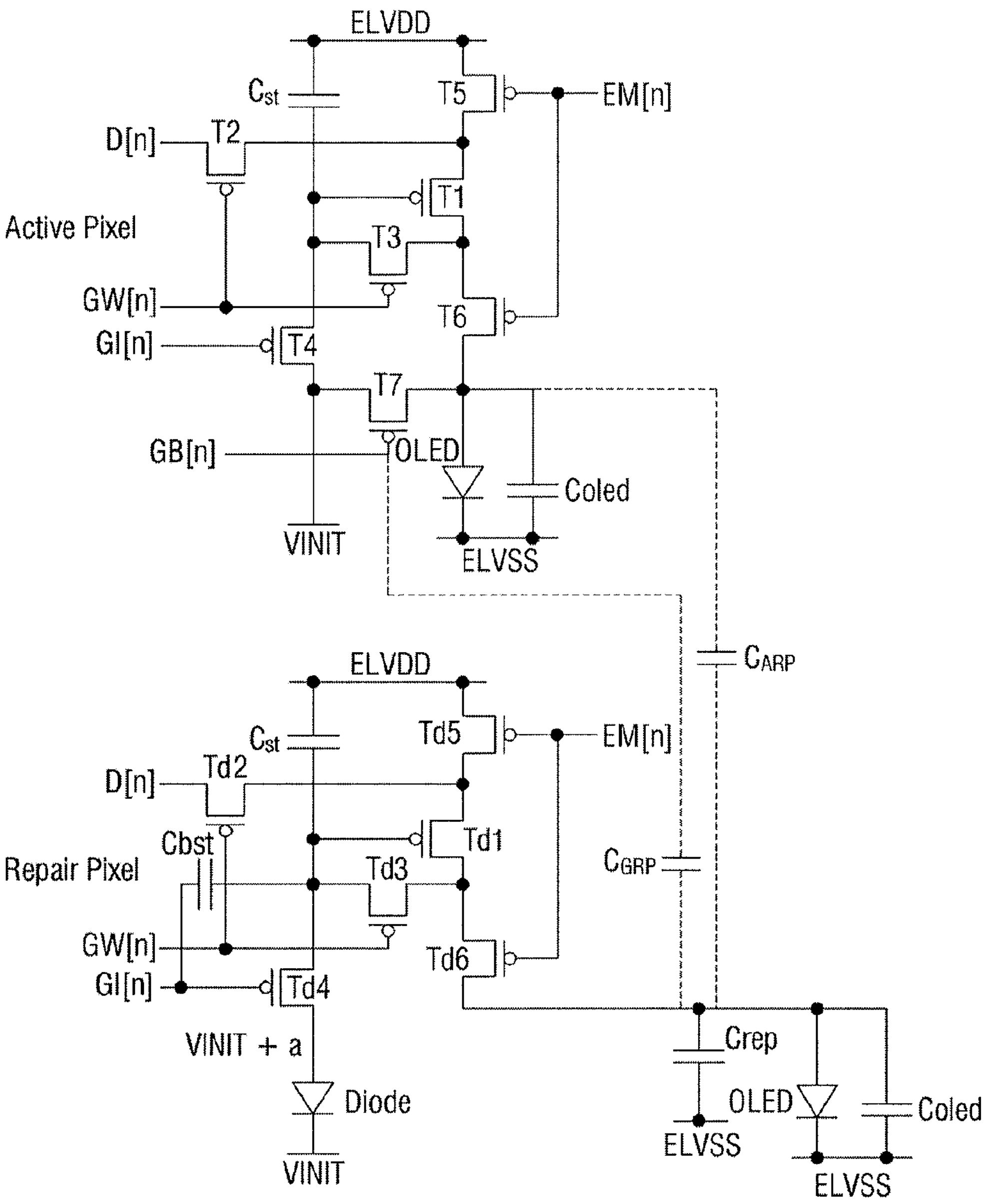
FIG. 16 illustrates an example of an active pixel and a dummy pixel.
Figure 17:
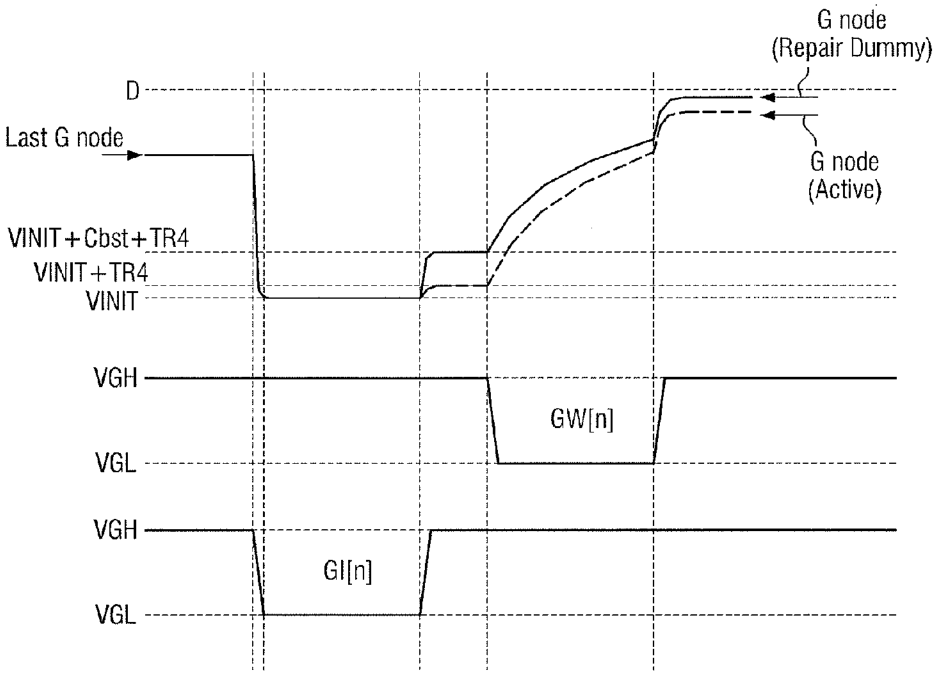
FIG. 17 illustrates a timing diagram illustrating variations in the levels of signals applied to the display device of the exemplary embodiment of FIG. 16.

FIG. 16 is an equivalent circuit diagram of an example of an active pixel and a dummy pixel of a display device, and FIG. 17 is a timing diagram illustrating an example of variations in the levels of signals applied to the embodiment of FIG. 16. The active pixel and the dummy pixel of FIG. 16 may have structures similar to their respective counterparts in FIG. 12.

Referring to FIG. 16, the gate terminals of a fourth transistor T4 and a seventh transistor T7 of a pixel driving circuit may be electrically isolated from each other. The fourth transistor T4 and the seventh transistor T7 may be driven by an initialization signal GI[n] and a black voltage signal GB[n], respectively.

Because the fourth transistor T4 and the seventh transistor T7 are driven by different signals, the timing of the generation of an incremental voltage VGBC by a black parasitic capacitor CGRP may differ from the embodiment of FIG. 12.

Unlike FIG. 12, a dummy driving circuit may further include a boost capacitor Cbst, which connects a terminal to which the initialization signal GI[n] is applied and a G node of the dummy driving circuit. For example, the boost capacitor Cbst may be connected to the G node Gnode of the dummy driving circuit, and may boost the voltage at the G node Gnode of the dummy driving circuit in response to a high-level initialization signal GI[n]. Accordingly, the gate-source voltage Vgs of a first dummy transistor Td1 may be lowered. As a result, the current that flows in the anode of the dummy driving circuit and the amount of charges that an anode parasitic capacitor $C_{ARP}$ is charged with may both be lowered. As the amount of charges that the anode parasitic capacitor $C_{ARP}$ is charged with decreases, a boost voltage VBST may also decrease. Therefore, the occurrence of slightly bright defects may be reduced regardless of the application of black data or low-grayscale data.

The gate terminals of the fourth transistor T4 and the seventh transistor T7 are illustrated in FIG. 16 as being electrically isolated from each other. In another embodiment, the gate terminals of the fourth transistor T4 and the seventh transistor T7 are connected to each other.

Referring to FIG. 17, in response to the transition of the initialization signal GI[n] from a low level to a high level, the boost capacitor Cbst, which is connected to a terminal to which the initialization signal GI[n] is applied, is charged with a higher voltage than a voltage increased from an initialization voltage VINIT due to the parasitic capacitance of a fourth dummy transistor Td4.

The voltage at the G node Gnode of the dummy driving circuit may be increased by the initialization signal GI[n]. In response to a low-level scan signal GW[n], the voltage at the G node Gnode of the dummy driving circuit may increase from a boosted initialization voltage, which is increased from the initialization voltage due to the boost capacitor Cbst and the parasitic capacitance of the fourth dummy transistor Td4. Because the voltages of the dummy driving circuit and the pixel driving circuit increase from different levels during the application of the low-level scan signal GW[n], the voltage at the G node Gnode of the dummy driving circuit may be maintained higher than the voltage at the G node Gnode of the pixel driving circuit.

Because the voltage at the G node Gnode of the dummy driving circuit may be maintained higher than the voltage at the G node Gnode of the pixel driving circuit, not only the gate-source voltage Vgs of the first dummy transistor Td1, but also the driving current that flows in the first dummy transistor Td1, may decrease. Accordingly, the occurrence of slightly bright defects may be reduced regardless of the application of black data or low-grayscale data.

In response to a high-level scan signal GW[n], the voltage at the G node Gnode of the dummy driving circuit or the pixel driving circuit may slightly increase due to the capacitance of a third dummy transistor Td3, which, in the meantime, may or may not be apparent depending on the threshold voltage of the third dummy transistor Td3 and the layout of the circuitry. However, it is assumed that the voltage at the G node Gnode of the dummy driving circuit or the pixel driving circuit is uniformly maintained in response to the application of the high-level scan signal GW[n].

Figure 18:
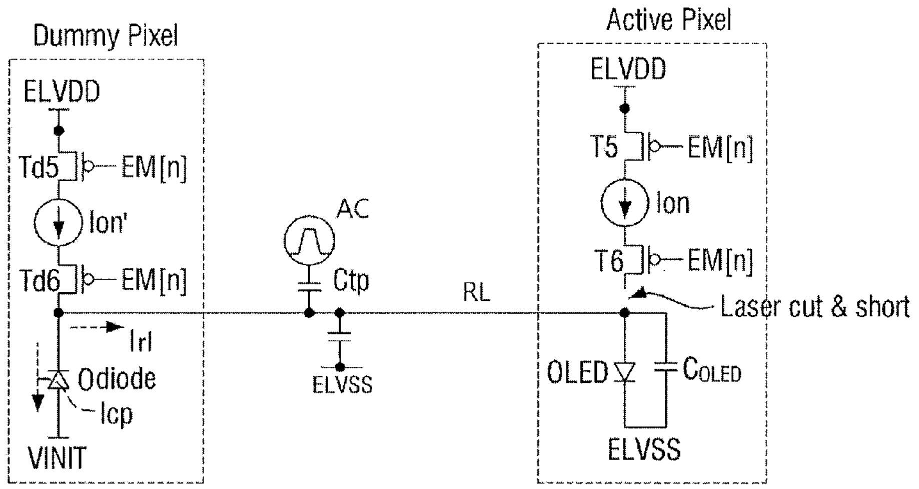
FIGS. 18 to 20 illustrate examples of connections between active pixels and dummy pixels.
Figure 19:
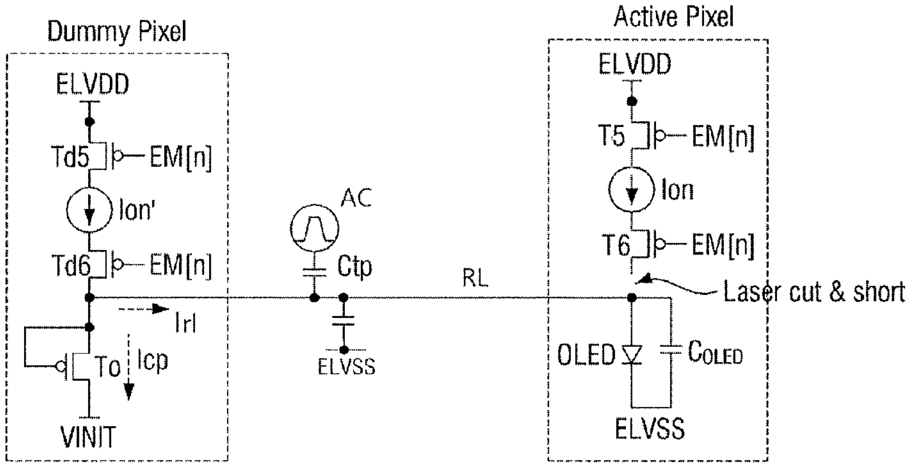
Figure 20:
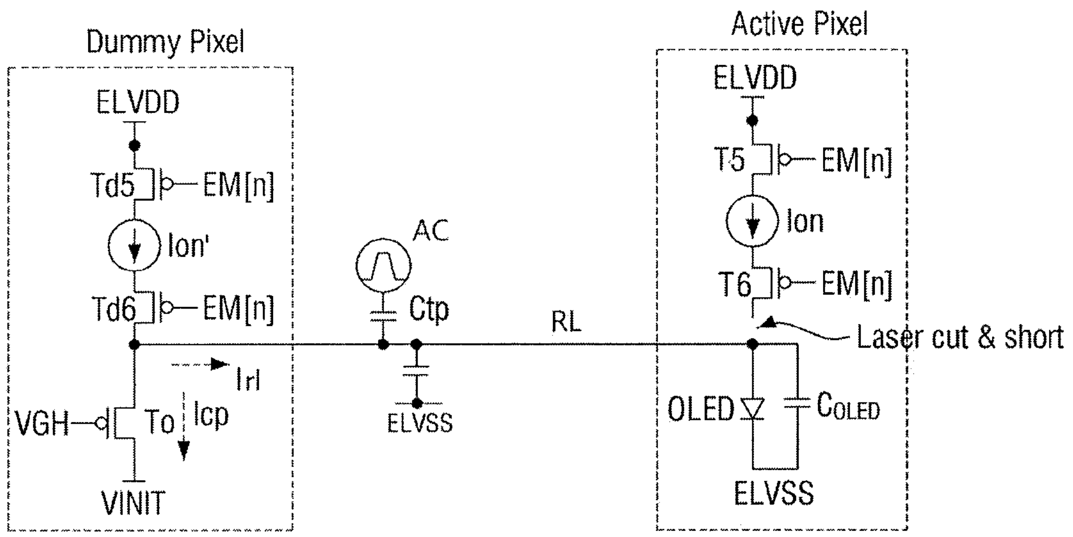

FIGS. 18 to 20 are circuit diagrams illustrating examples of connections between active pixels and dummy pixels. Referring to FIG. 18, a pixel driving circuit and a dummy driving circuit may be connected by a repair line RL and a black voltage line BL. Because the pixel driving circuit and the dummy driving circuit are connected by the repair line RL, data may continue to be applied to an OLED of the pixel driving circuit even when a defect occurs in the pixel driving circuit.

The dummy driving circuit and the pixel driving circuit may be connected by the repair line RL. The repair line RL may extend in a row direction to overlap the pixel driving circuit. Because the repair line RL overlaps the pixel driving circuit, an anode parasitic capacitor CARP with a very large capacitance may be generated at the repair line RL.

An initialization line and the black voltage line BL may be parallel to the repair line RL. Due to the initialization line, the black voltage line BL, and the repair line RL, fringe capacitance may be generated which may affect the pixel driving circuit. That is, due to the initialization line, the black voltage line BL, and the repair line RL, a black parasitic capacitor $C_{GRP}$ may be generated.

All coupling phenomena that may occur due to the repair line RL, the pixel electrode of each pixel, the initialization line, and the black voltage line may be considered to be anode AC coupling. The equivalent capacitor of the anode parasitic capacitor $C_{ARP}$ and the black parasitic capacitor $C_{GRP}$, which are generated due to the repair line RL, the pixel electrode of each pixel, the initialization line, and the black voltage line, may be considered to be a total parasitic capacitor Ctp.

It may be assumed that an initialization voltage VINIT applied to the dummy driving circuit is uniform. It may also be assumed that a driving current Ion' that flows through a first dummy transistor Td1 is uniformly maintained, unless a boost diode Diode or a boost transistor Tu is provided.

As described above, the occurrence of slightly bright defects upon the application of black data or low-grayscale data may be reduced by lowering the current applied to the repair line RL. To accomplish this, a discharge diode Odiode may be connected to the drain terminal of a sixth dummy transistor Td6, so as to distribute the driving current Ion' by as much as a discharge emission current Icp.

Accordingly, a repair current Irl that flows in the repair line RL may be lowered. As a result, the amount of charges the total parasitic capacitor Ctp is charged with may also be lowered. Because the amount of charges that the total parasitic capacitor Ctp is charged with decreases, a boost voltage VBST generated by anode AC coupling may also decrease. Therefore, the occurrence of slightly bright defects upon the application of black data or low-grayscale data may be reduced.

The active pixel and the dummy pixel of FIG. 19 or 20 may have structures similar to their respective counterparts in FIG. 18. Referring to FIG. 19, it may be assumed that an initialization voltage VINIT applied to a dummy driving circuit is uniform and that a driving current Ion' that flows through a first dummy transistor Td1 is uniformly maintained, unless a boost diode Diode or a boost transistor Tu is provided. A discharge transistor To may be connected to the drain terminal of a sixth dummy transistor Td6. The drain terminal and the source terminal of the discharge transistor To may be connected together, to thereby form a diode connection. The discharge transistor To, which is diode-connected, may operate in a similar manner to the discharge diode Odiode in FIG. 18, and may distribute the driving current Ion' by as much as a discharge current Icp.

Accordingly, a repair current Irl that flows in the repair line RL may be lowered. As a result, the amount of charges that the total parasitic capacitor Ctp is charged with may also be lowered. Because the amount of charges that the total parasitic capacitor Ctp is charged with decreases, a boost voltage VBST generated by anode A C coupling may decrease. Therefore, the occurrence of slightly bright defects upon the application of black data or low-grayscale data may be reduced.

Referring to FIG. 20, it may be assumed that an initialization voltage VINIT applied to a dummy driving circuit is uniform and that a driving current Ion' that flows through a first dummy transistor Td1 is uniformly maintained, unless a boost diode Diode or a boost transistor Tu is provided. A discharge transistor To may be connected to the drain terminal of a sixth dummy transistor Td6. A high voltage may be applied to the gate terminal of the discharge transistor To. In response to a high voltage being applied to the gate terminal of the discharge transistor To, the discharge transistor To may not operate, but a leakage current Ilc may be generated in the discharge transistor To. Due to the discharge transistor To, the driving current Ion' may be distributed by as much as the leakage current Ilc.

Accordingly, a repair current Irl that flows in the repair line RL may be lowered. As a result, the amount of charges that the total parasitic capacitor Ctp is charged with may be lowered. Because the amount of charges that the total parasitic capacitor Ctp is charged with decreases, a boost voltage VBST generated by anode AC coupling may also decrease. Therefore, the occurrence of slightly bright defects upon the application of black data or low-grayscale data may be reduced.

Figure 21:
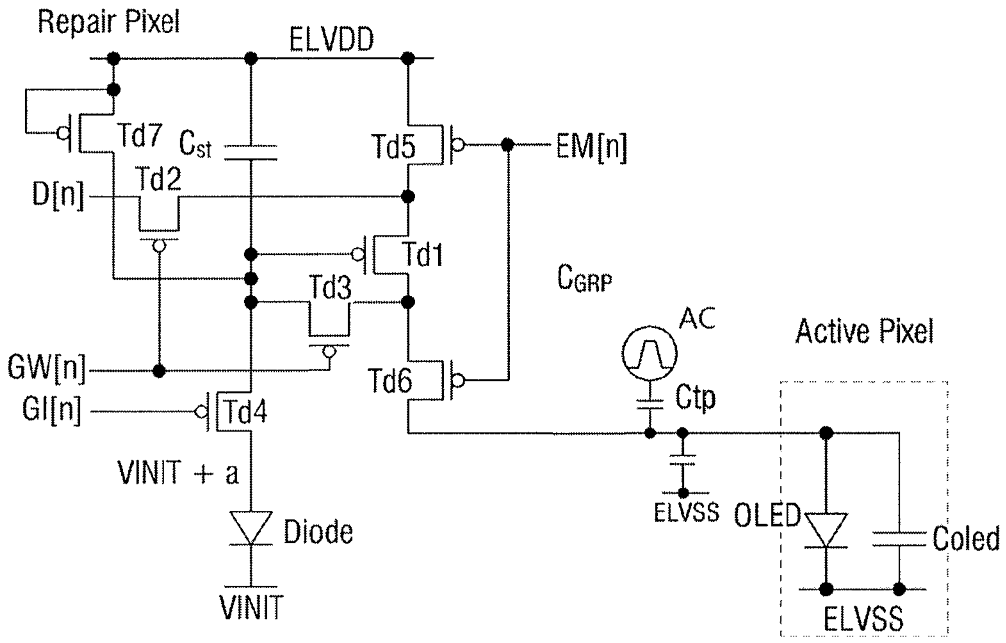
FIGS. 21 and 22 examples of dummy pixels.
Figure 22:
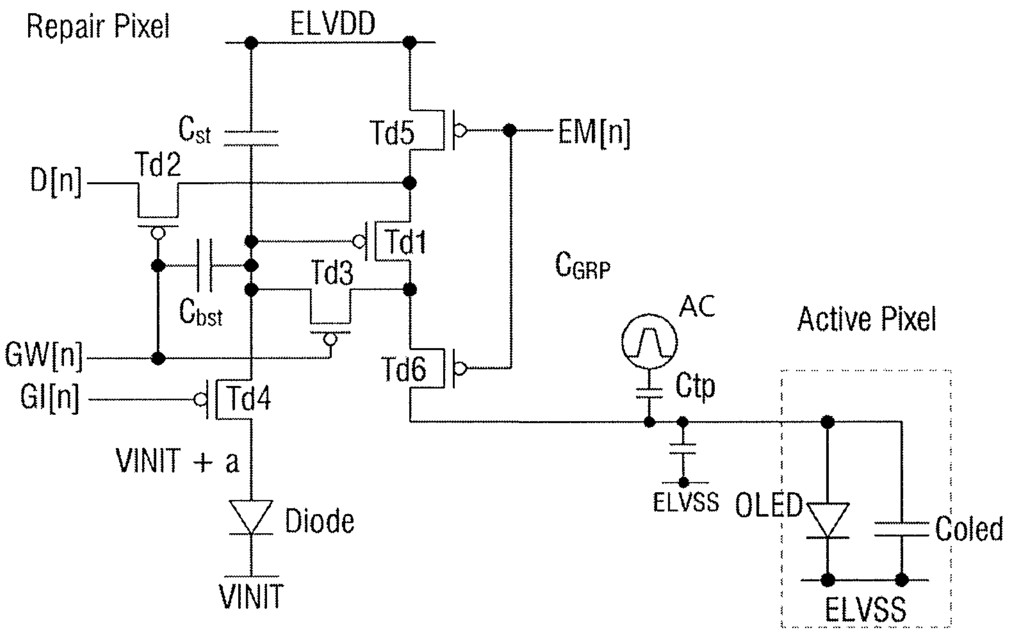

FIGS. 21 and 22 are equivalent circuit diagrams of dummy pixels according to other embodiments. FIGS. 21 and 22 are equivalent circuit diagrams of modified examples of the dummy driving circuit of FIG. 12, and illustrate only parts of a pixel driving circuit, e.g., an OLED and an OLED capacitor Coled. In FIGS. 1 to 22, like reference numerals indicate like elements.

All coupling phenomena that may occur due to a repair line RL, the pixel electrode of each pixel, an initialization line, and/or a black voltage line may be considered to be anode AC coupling. The equivalent capacitor of an anode parasitic capacitor $C_{ARP}$ and a black parasitic capacitor $C_{GRP}$, which are generated due to the repair line RL, the pixel electrode of each pixel, the initialization line, and the black voltage line, may be considered to be a total parasitic capacitor Ctp.

Referring to FIG. 21, unlike the dummy driving circuit of FIG. 1, a dummy driving circuit may further include a seventh dummy transistor Td7, which connects a terminal to which a first power source voltage ELVDD is applied and a G node Gnode of the dummy driving circuit.

The gate terminal and the source terminal of the seventh dummy transistor Td7 may be connected together, to thereby form a diode connection. Because the seventh dummy transistor Td7, which is diode-connected, the voltage at the G node Gnode of the dummy driving circuit may be increased. As a result, the gate-source voltage Vgs of a first dummy transistor Td1 may be lowered. As the gate-source voltage Vgs of the first dummy transistor Td1 decreases, not only the current that flows in the first dummy transistor Td1, but also the amount of charges that an anode parasitic capacitor $C_{ARP}$ is charged with, may both decrease, and as a result, a boost voltage VBST may decrease. Therefore, the occurrence of slightly bright defects may be reduced regardless of the application of black data or low-grayscale data.

Referring to FIG. 22, unlike the dummy driving circuit of FIG. 12, a dummy driving circuit may further include a boost capacitor Cbst, which connects a terminal to which a scan signal GW[n] is applied and a G node Gnode of the dummy driving circuit. For example, the boost capacitor Cbst may be connected to the G node Gnode of the dummy driving circuit, and may boost the voltage at the G node Gnode of the dummy driving circuit in response to a high-level scan signal GW[n]. Accordingly, the gate-source voltage Vgs of a first dummy transistor Td1 may be lowered. As a result, the current that flows in the anode of the dummy driving circuit and the amount of charges that an anode parasitic capacitor $C_{ARP}$ is charged with may both be lowered. As the amount of charges the anode parasitic capacitor $C_{ARP}$ is charged with decreases, a boost voltage VBST may decrease. Therefore, the occurrence of slightly bright defects may be reduced regardless of the application of black data or low-grayscale data.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods described herein.

Also, another embodiment may include a computer-readable medium, e.g., a non-transitory computer-readable medium, for storing the code or instructions described above. The computer-readable medium may be a volatile or non-volatile memory or other storage device, which may be removably or fixedly coupled to the computer, processor, controller, or other signal processing device which is to execute the code or instructions for performing the method embodiments described herein.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise indicated. Accordingly, it will be understood by those of skill in the art that various changes in form and details may be made without departing from the spirit and scope of the present invention as set forth in the following claims.

What is claimed is:

1. A display device, comprising:

a display panel including a plurality of dummy pixels adjacent to a plurality of active pixels;

a controller to control a pixel driving circuit in each of the active pixels and a dummy driving circuit in each of the dummy pixels, wherein the dummy driving circuit includes a pumping capacitor, and a first transistor and a second transistor which connect a terminal to which an initialization voltage is to be applied and a dummy anode terminal, and wherein:

the first transistor of the dummy driving circuit includes a control terminal connected to a first input signal terminal, a first terminal connected to the dummy anode terminal, and a second terminal connected to a first node, the pumping capacitor of the dummy driving circuit is connected to the first node and a first power source voltage terminal, and the second transistor of the dummy driving circuit includes a control terminal connected to a second input signal terminal, a first terminal connected to the second terminal of the first transistor at the first node, and a second terminal connected to a second power source voltage terminal.

2. The device as claimed in claim 1, wherein the controller includes:

a comparator to determine if the pixel driving circuit is defective, and a synchronizer to synchronize an output signal of the dummy driving circuit.

3. The device as claimed in claim 2, further comprising:

a plurality of repair lines extending in a first direction, wherein the repair lines overlap the active pixels and are to be electrically connected to the dummy pixels adjacent to the active pixels.

4. The device as claimed in claim 3, wherein at least one of the active pixels is electrically connected to at least one of the repair lines.

5. The device as claimed in claim 3, wherein the comparator is to control connections between the repair lines and the pixel driving circuits of the active pixels.

6. The device as claimed in claim 1, wherein the pixel driving circuit includes a third transistor and a fourth transistor, and wherein a control terminal of the third transistor is electrically connected to a control terminal of the fourth transistor.

7. The device as claimed in claim 1, wherein the pixel driving circuit includes a third transistor and a fourth transistor, wherein a control terminal of the third transistor is connected to the second input signal terminal, and wherein a control terminal of the fourth transistor is connected to a third input signal terminal.

8. A display device, comprising:

a display panel including a plurality of dummy pixels adjacent to a plurality of active pixels;

a controller to control a pixel driving circuit in each of the active pixels and a dummy driving circuit in each of the dummy pixels, wherein the dummy driving circuit includes a boost diode and a first transistor, wherein a voltage at an anode terminal of the boost diode is applied to a gate terminal of a dummy driving transistor of the dummy driving circuit through the first transistor when the first transistor is turned on, and wherein the voltage at the anode terminal of the boost diode is boosted from an initialization voltage by the boost diode.

9. The device as claimed in claim 8, wherein the controller includes:

a comparator to determine if the pixel driving circuit is defective, and a synchronizer to synchronize an output signal of the dummy driving circuit.

10. The device as claimed in claim 9, further comprising:

a plurality of repair lines extending in a first direction, wherein the repair lines overlap the active pixels and are to be electrically connected to dummy pixels adjacent to the active pixels.

11. The device as claimed in claim 10, wherein at least one of the active pixels is electrically connected to at least one of the repair lines.

12. The device as claimed in claim 10, wherein the comparator is to control connections between the repair lines and the pixel driving circuits of the active pixels.

13. The device as claimed in claim 8, wherein the pixel driving circuit includes a second transistor and a third transistor, and wherein a control terminal of the second transistor is electrically connected to a control terminal of the third transistor.

14. The device as claimed in claim 8, wherein the pixel driving circuit includes a second transistor and a third transistor, wherein a control terminal of the second transistor is connected to a first input signal terminal, and wherein a control terminal of the third transistor is connected to a second input signal terminal.

15. The device as claimed in claim 8, wherein the dummy driving circuit includes a first boost capacitor connected to the gate terminal of the dummy driving transistor and a control terminal of the first transistor.

16. The device as claimed in claim 8, wherein the dummy driving circuit includes a fourth transistor connected to the gate terminal of the dummy driving transistor and a first power source voltage terminal, and wherein a control terminal of the fourth transistor is electrically connected to a source terminal of the fourth transistor.

17. The device as claimed in claim 8, wherein the dummy driving circuit includes a second boost capacitor connected to the gate terminal of the dummy driving transistor and a third input signal terminal.

18. A display device, comprising:

a display panel includes a plurality of dummy pixels adjacent to a plurality of active pixels;

a controller to control an active pixel driving circuit in each of the active pixels and a dummy pixel driving circuit in each of the dummy pixels, wherein the dummy pixel driving circuit and the active pixel driving circuit are connected by one of a plurality of repair lines, and wherein the dummy pixel driving circuit includes a discharge diode connected to a terminal of an emitting diode in a defective one of the active pixels, and wherein the discharge diode discharges a part of a driving current supplied from a dummy driving transistor of the dummy pixel driving circuit such that the driving current is partially supplied to the emitting diode in the defective one of the active pixel.

19. The device as claimed in claim 18, wherein the controller includes:

a comparator to determine if the active pixel driving circuit is defective and a synchronizer to synchronize an output signal of the dummy pixel driving circuit.

20. The device as claimed in claim 19, wherein the repair lines overlap the active pixels and are to be electrically connected to the dummy pixels adjacent to the active pixels.

* * * * *